US00RE50118E

(19) United States
(12) Reissued Patent
Nagano et al.

(10) Patent Number: US RE50,118 E
(45) Date of Reissued Patent: Sep. 10, 2024

(54) IMAGE DISPLAY APPARATUS FOR VEHICLE

(71) Applicants: Maxell, Ltd., Kyoto (JP); Hitachi Industry & Control Solutions, Ltd., Ibaraki (JP)

(72) Inventors: Yuki Nagano, Oyamazaki (JP); Souta Sato, Oyamazaki (JP); Yuji Fujita, Oyamazaki (JP); Takumi Nakada, Oyamazaki (JP); Kazuomi Kaneko, Oyamazaki (JP)

(73) Assignees: MAXELL, LTD., Kyoto (JP); HITACHI INDUSTRY & CONTROL SOLUTIONS, LTD., Ibaraki (JP)

(21) Appl. No.: 18/081,853

(22) Filed: Dec. 15, 2022

Related U.S. Patent Documents

Reissue of:
(64) Patent No.: 10,871,655
Issued: Dec. 22, 2020
Appl. No.: 16/068,985
PCT Filed: Dec. 12, 2016
PCT No.: PCT/JP2016/086914
§ 371 (c)(1),
(2) Date: Jul. 10, 2018
PCT Pub. No.: WO2017/138242
PCT Pub. Date: Aug. 17, 2017

(30) Foreign Application Priority Data

Feb. 12, 2016 (JP) ..... 2016-024711
Mar. 31, 2016 (JP) ..... 2016-071034

(51) Int. Cl.
*G09G 3/02* (2006.01)
*B60K 35/00* (2024.01)
(Continued)

(52) U.S. Cl.
CPC ..... *G09G 3/02* (2013.01); *B60K 35/00* (2013.01); *G02B 27/0101* (2013.01);
(Continued)

(58) Field of Classification Search
CPC ..... B60K 35/00; B60K 2370/744; B60K 2370/736; B60K 2370/52;
(Continued)

(56) References Cited

U.S. PATENT DOCUMENTS 9,753,289 B2 * 9/2017 Hirokawa ..... G02B 27/0179
2016/0320624 A1 11/2016 Yamaoka
(Continued)

FOREIGN PATENT DOCUMENTS

CN 103182984 A 7/2013
JP 2003-107391 A 4/2003
(Continued)

OTHER PUBLICATIONS

International Search Report of PCT/JP2016/086914 dated Feb. 17, 2017.
(Continued)

*Primary Examiner* — Christina Y. Leung
(74) *Attorney, Agent, or Firm* — Mattingly & Malur, PC

(57) ABSTRACT

An image display apparatus 100 for a vehicle is provided with: an image display unit 2 that has a light source and a display element and outputs image light; a mirror 3 that reflects the image light output by the image display unit 2 toward a windshield 7; a mirror drive unit 4 that changes the angle and position of the mirror 3; and a control unit 10 that determines amounts of change in the angle and position of the mirror and controls the mirror drive unit 4. The control unit 10 makes determinations of the amount of change for the angle and position of the mirror in association with each other such that the image is visible even if the position of the driver's eyes 8 changes and the display state of the image with respect to the driver does not change.

10 Claims, 40 Drawing Sheets

(51) Int. Cl.

| | |
|---|---|
| ***G02B 27/01*** | (2006.01) |
| ***G09G 3/00*** | (2006.01) |
| ***G09G 5/00*** | (2006.01) |
| ***G09G 5/38*** | (2006.01) |
| *B60K 35/23* | (2024.01) |
| *B60K 35/65* | (2024.01) |
| *B60K 35/81* | (2024.01) |

(52) U.S. Cl.
CPC ..... *G02B 27/0149* (2013.01); *G02B 27/0179* (2013.01); *G09G 3/001* (2013.01); *G09G 5/00* (2013.01); *G09G 5/38* (2013.01); *B60K 35/23* (2024.01); *B60K 35/654* (2024.01); *B60K 35/658* (2024.01); *B60K 35/81* (2024.01); *B60K 2360/23* (2024.01); *B60K 2360/334* (2024.01); *G02B 2027/0118* (2013.01); *G02B 2027/014* (2013.01); *G02B 2027/0159* (2013.01); *G02B 2027/0181* (2013.01); *G02B 2027/0183* (2013.01); *G02B 2027/0187* (2013.01); *G09G 2320/06* (2013.01); *G09G 2320/0626* (2013.01); *G09G 2354/00* (2013.01); *G09G 2360/144* (2013.01); *G09G 2380/10* (2013.01)

(58) Field of Classification Search
CPC ..... B60K 2370/334; B60K 2370/1529; B60K 2370/23; G02B 27/0149; G02B 27/0179; G02B 27/0101; G02B 2027/0118; G02B 2027/014; G02B 2027/0181; G02B 2027/0187; G02B 2027/0183; G02B 2027/0159; G09G 5/00; G09G 3/02; G09G 3/001; G09G 5/38; G09G 2320/06; G09G 2320/0626; G09G 2360/144; G09G 2380/10; G09G 2354/00
See application file for complete search history.

(56) References Cited

U.S. PATENT DOCUMENTS

| | | | | |
|---|---|---|---|---|
| 2017/0038583 | A1* | 2/2017 | Kim | B60R 1/00 |
| 2018/0017792 | A1* | 1/2018 | Takazawa | B60K 35/00 |

FOREIGN PATENT DOCUMENTS

| | | | | | |
|---|---|---|---|---|---|
| JP | 2009184406 | A | * | 8/2009 | |
| JP | 2010-230157 | A | | 10/2010 | |
| JP | 2015-225119 | A | | 12/2015 | |
| WO | WO-2015041203 | A1 | * | 3/2015 | G02B 27/0101 |

OTHER PUBLICATIONS

Chinese Office Action received in corresponding Chinese Application No. 201680071335 dated Dec. 25, 2019.

* cited by examiner

<ADJUSTMENT METHOD 1 (PRIOR ART)>
ONLY MIRROR ROTATION (a) ADJUSTMENT METHOD 1 (PRIOR ART)

(b) ADJUSTMENT METHODS 2 TO 4

$$L_3(x) = L_1\cos\theta_1 + L_2\cos(\theta_1+\theta_2)$$

$$L_3(y) = L_1\sin\theta_1 + L_2\sin(\theta_1+\theta_2)$$

<ADJUSTMENT METHOD 1> (PRIOR ART)

| | EYE POINT | | | MIRROR | | | WINDSHIELD REFLECTION | | VIRTUAL IMAGE CENTER | |
|---|---|---|---|---|---|---|---|---|---|---|
| | CENTER COORDINATES | | DEPRESSION ANGLE | CENTER COORDINATES | | ROTATION ANGLE | CENTER COORDINATES | | CENTER COORDINATES | |
| | X1 | Y1 | θ1 | X2 | Y2 | θ2 | X3 | Y3 | X4 | Y4 |
| EYE POINT = A | 18 | 100 | 12 | 1261 | -598 | -4 | 778 | -60 | 1975 | -312 |
| EYE POINT = B | 0 | 0 | 8 | 1261 | -598 | 0 | 891 | -125 | 1981 | -278 |
| EYE POINT = C | -11 | -100 | 4 | 1261 | -598 | 4 | 971 | -171 | 1984 | -245 |

UNIT : COORDINATES(mm) ANGLE(deg)

<ADJUSTMENT METHOD 2>

| | EYE POINT | | | MIRROR | | | WINDSHIELD REFLECTION | | VIRTUAL IMAGE CENTER | |
|---|---|---|---|---|---|---|---|---|---|---|
| | CENTER COORDINATES | | DEPRESSION ANGLE | CENTER COORDINATES | | ROTATION ANGLE | CENTER COORDINATES | | CENTER COORDINATES | |
| | X1 | Y1 | θ1 | X2 | Y2 | θ2 | X3 | Y3 | X4 | Y4 |
| EYE POINT = A | 0 | 100 | 14 | 1296 | -542 | -6 | 891 | -125 | 1939 | -390 |
| EYE POINT = B | 0 | 0 | 8 | 1261 | -598 | 0 | 891 | -125 | 1981 | -278 |
| EYE POINT = C | 0 | -100 | 2 | 1210 | -643 | 6 | 891 | -125 | 1999 | -157 |

UNIT : COORDINATES(mm) ANGLE(deg)

<ADJUSTMENT METHOD 3>

| | EYE POINT | | | MIRROR | | | WINDSHIELD REFLECTION | | VIRTUAL IMAGE CENTER | |
|---|---|---|---|---|---|---|---|---|---|---|
| | CENTER COORDINATES | | DEPRESSION ANGLE | CENTER COORDINATES | | ROTATION ANGLE | CENTER COORDINATES | | CENTER COORDINATES | |
| | X1 | Y1 | θ1 | X2 | Y2 | θ2 | X3 | Y3 | X4 | Y4 |
| EYE POINT = A | 0 | 100 | 8 | 1174 | -648 | 0 | 622 | 7 | 1981 | -178 |
| EYE POINT = B | 0 | 0 | 8 | 1261 | -598 | 0 | 891 | -125 | 1981 | -278 |
| EYE POINT = C | 0 | -100 | 8 | 1347 | -548 | 0 | 1120 | -257 | 1981 | -378 |

UNIT : COORDINATES(mm) ANGLE(deg)

<ADJUSTMENT METHOD 4>

| | EYE POINT | | | MIRROR | | | WINDSHIELD REFLECTION | | VIRTUAL IMAGE CENTER | |
|---|---|---|---|---|---|---|---|---|---|---|
| | CENTER COORDINATES | | DEPRESSION ANGLE | CENTER COORDINATES | | ROTATION ANGLE | CENTER COORDINATES | | CENTER COORDINATES | |
| | X1 | Y1 | θ1 | X2 | Y2 | θ2 | X3 | Y3 | X4 | Y4 |
| EYE POINT = A | 17 | 100 | 11 | 1243 | -613 | -3 | 750 | -43 | 1981 | -278 |
| EYE POINT = B | 0 | 0 | 8 | 1261 | -598 | 0 | 891 | -125 | 1981 | -278 |
| EYE POINT = C | -12 | -100 | 5 | 1281 | -583 | 3 | 1005 | -191 | 1981 | -278 |

UNIT: COORDINATES(mm) ANGLE(deg)

CURVED RAIL DRIVE SYSTEM

LINEAR RAIL + ROTARY DRIVE SYSTEM

IMAGE DISPLAY APPARATUS FOR VEHICLE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

TECHNICAL FIELD

The present invention relates to an image display apparatus for a vehicle which is mounted on a vehicle or the like and is suitable for displaying various types of image information.

BACKGROUND ART

In recent years, as one of techniques for superimposing images on each other in a real space, an image display apparatus for a vehicle (so-called head up display (hereinafter referred to as HUD)) for displaying various information on a front glass (also referred to as a windshield) of the vehicle has been put into practical use. For example, information for the driver is provided as image information to be displayed, thereby being capable of supporting the driving operation of the vehicle.

In a basic configuration of the HUD, an optically generated image is projected onto the windshield, the reflected image light is incident on driver's eyes, and the driver visually recognizes the virtual image in front of the windshield. In this situation, the appearance of the image (virtual image) varies depending on a position (eye point) of the driver's eyes. In other words, if a direction of the image light projected from the HUD does not match the position of the driver's eyes, the driver cannot visually recognize the image normally.

Therefore, in order to adjust the projection direction according to the position of the driver's eyes, the HUD is provided with a mirror (concave mirror) for reflecting the generated image light toward the windshield and a mirror drive mechanism for changing the angle of the mirror (for example, refer to Patent Literature 1).

CITATION LIST

Patent Literature

PTL 1: Japanese Patent Application Laid-Open No. 2003-107391

SUMMARY OF INVENTION

Technical Problem

In the conventional HUD including PTL 1, although a mirror drive mechanism for changing the angle of the mirror is provided, the mirror drive mechanism has only a function to rotate the mirror. For that reason, the driver can adjust the angle of the mirror according to a height of his eyes to set the image (virtual image) to be visually recognized, but the appearance of the image changes. For example, a reflection position on the windshield surface or a position at which the virtual image is formed is moved, resulting in a possibility of blocking a part of a front viewing field necessary for driving. In addition, an angle (depression angle) at which to look down on the image changes, which may cause the driver to feel uncomfortable.

There are also cases in which the display position of the image is desirable to be moved according to not only the position of the driver's eyes but also the driving operation and the road condition. A display position moving function for that purpose is also required to be realized with a simple structure.

It is an object of the present invention to provide an image display apparatus for a vehicle which can visually recognize an image more suitably with a simple structure even if a position of driver's eyes changes.

Solution to Problem

According to the present invention, in order to solve the above problem, there is provided an image display apparatus for a vehicle which is mounted on a vehicle, projects an image light on a windshield, and forms a virtual image in front of the windshield to display an image for a driver, including: an image display unit that includes a light source and a display element and emits the image light; a mirror that reflects the image light emitted from the image display unit toward the windshield; a mirror drive unit that changes an angle and a position of the mirror; and a control unit that determines change amounts in the angle and the position of the mirror and controls the mirror drive unit, in which the control unit determines the change amounts in the angle and the position of the mirror in conjunction with each other to enable the virtual image to be visually recognized and prevent a display state of the image for the driver from changing even if a position of the driver's eyes changes.

It is preferable that the mirror drive unit includes a link mechanism having three rotary motors which rotate the mirror and two movable arms which couple the rotary motors with each other.

Advantageous Effects of Invention

According to the present invention, there can be provided an image display apparatus for a vehicle which can visually recognize an image more suitably with a simple structure even if the position of the driver's eyes changes.

DESCRIPTION OF EMBODIMENTS

First, a basic configuration of an image display apparatus for a vehicle will be described.

Figure 1:
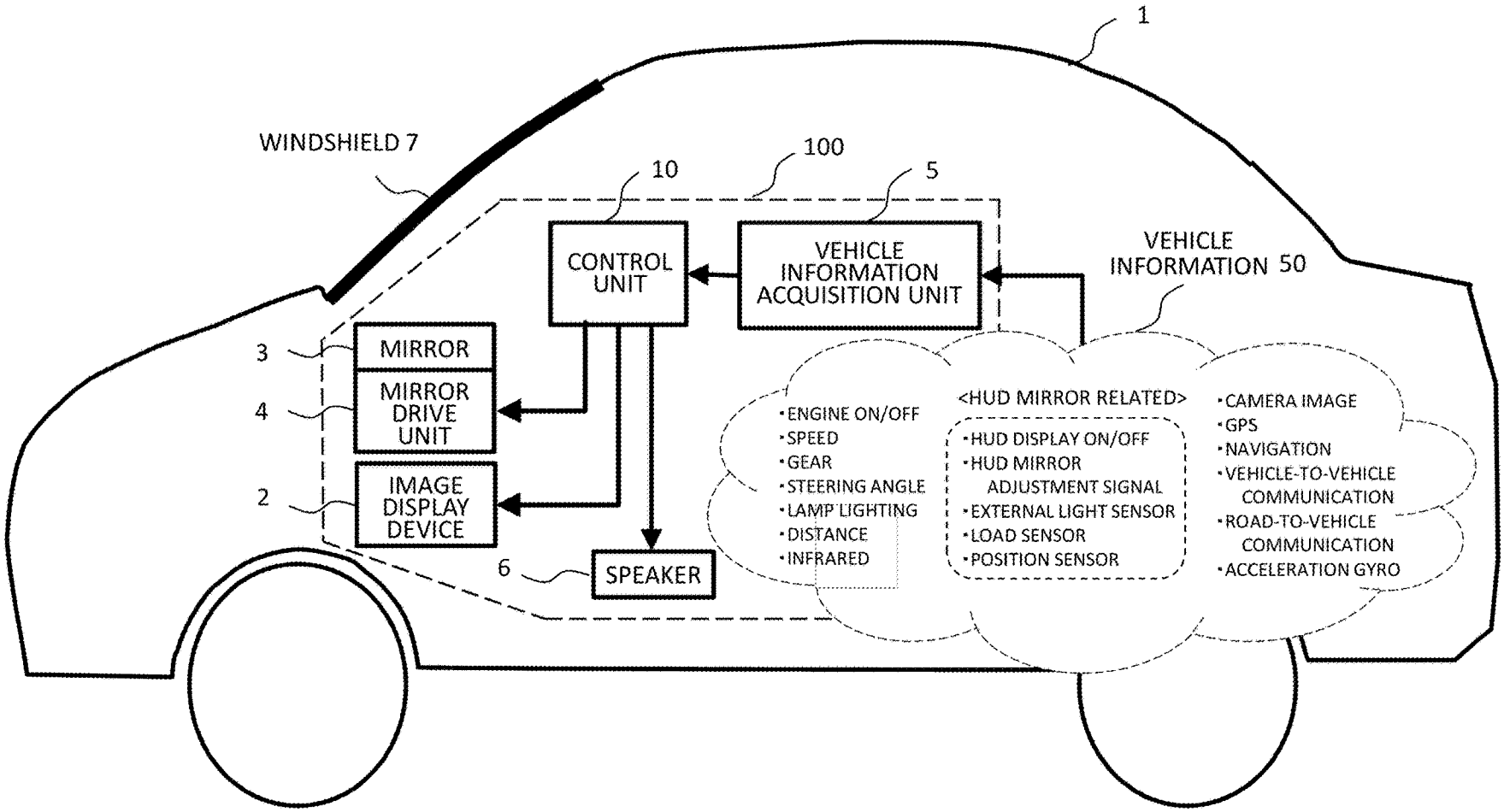
FIG. 1 is a schematic diagram illustrating an outline of a head up display mounted on a vehicle.

FIG. 1 is a schematic diagram illustrating an outline of a head up display (hereinafter referred to as HUD) which is mounted on a vehicle. The HUD 100 mounted on the vehicle 1 projects an image light generated by an image display device 2 onto a front glass (hereinafter referred to as windshield 7) of the vehicle 1 through a mirror 3. The image light reflected by the windshield 7 is incident on driver's eyes, and the driver visually recognizes the image from the HUD. The image to be displayed includes Information related to driving and supports a driving operation. The inside of the HUD 100 includes a vehicle information acquisition unit 5 that acquires various kinds of vehicle information 50, a control unit 10 that generates image information to be displayed based on the vehicle information 50, a mirror drive unit 4 that drives the mirror 3, a speaker 6 that outputs voice information to the driver, and so on. The vehicle information 50 includes speed information and gear information indicating a driving condition of the vehicle as well as operation signals by the operator such as an HUD display on/off signal and an HUD mirror adjustment signal associated with adjustment of the mirror 3 of the HUD.

Figure 2:
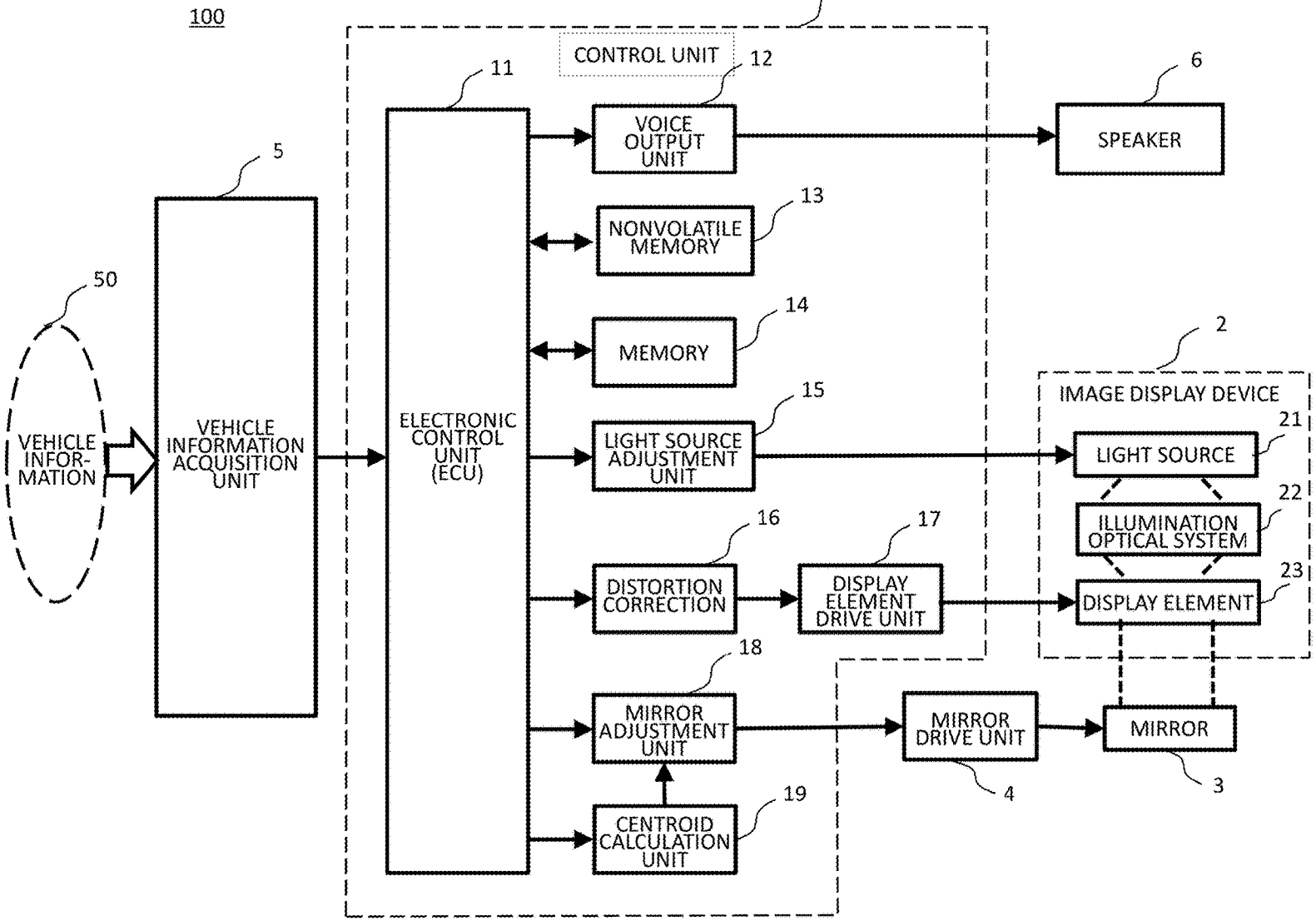
FIG. 2 is a block diagram showing an internal configuration of a head up display 100.

FIG. 2 is a block diagram showing the internal configuration of the HUD 100. Various types of vehicle information 50 are input to the vehicle information acquisition unit 5 and transmitted to the control unit 10. An electronic control unit (ECU) 11 inside the control unit 10 generates an image signal to be displayed by the HUD based on the input vehicle information. In addition, the electronic control unit 11 generates a control signal for the mirror 3 and a voice signal of the speaker 6 based on the vehicle information. The image display device 2 includes a light source 21 such as an LED or a laser, an illumination optical system 22, and a display element 23 such as a liquid crystal element, and emits an image light generated by the display element 23 toward the mirror 3.

The control unit 10 includes a voice output unit 12 that outputs a voice signal to the speaker 6, a nonvolatile memory 13 that stores a program to be executed by the ECU 11, a memory 14 that stores image information and control information, a light source adjustment unit 15 that controls the light source 21 of the image display device 2, a distortion correction unit 16 that corrects a distortion of the image signal to be displayed, a display element drive unit 17 that drives the display element 23 based on the corrected image signal, a mirror adjustment unit 18 that outputs a drive signal to the mirror drive unit 4, a centroid calculation unit 19 that calculates a centroid position of the driver, and the like.

Figure 3:
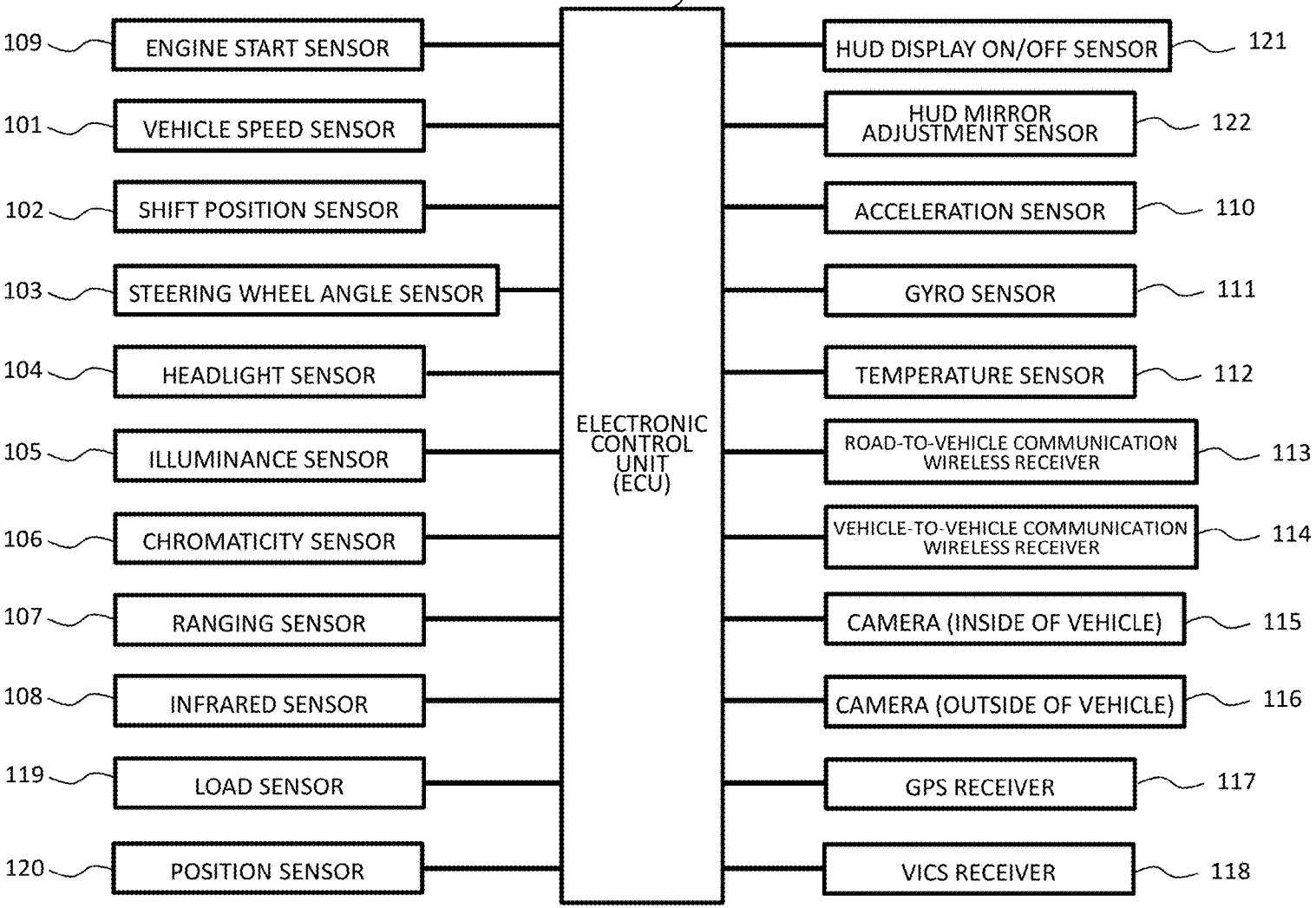
FIG. 3 is a diagram showing an example of a hardware configuration relating to acquisition of vehicle information.

FIG. 3 is a diagram showing an example of a hardware configuration relating to acquisition of the vehicle information 50 in the HUD. A hardware configuration of parts of the vehicle information acquisition unit 5 and the control unit 10 will be shown in FIG. 3. The vehicle information 50 is acquired by an information acquisition device such as various types of sensors that are connected to the ECU 11 under the control of the ECU 11, for example.

The information acquisition devices include, for example, a vehicle speed sensor 101, a shift position sensor 102, a steering wheel angle sensor 103, a headlight sensor 104, an illuminance sensor 105, a chromaticity sensor 106, a ranging sensor 107, an infrared sensor 108, an engine start sensor 109, an acceleration sensor 110, a gyro sensor 111, a temperature sensor 112, a road-to-vehicle communication wireless receiver 113, a vehicle-to-vehicle communication wireless receiver 114, a camera (inside of the vehicle) 115, a camera (outside of the vehicle) 116, a GPS receiver 117, a VICS (vehicle information and communication system (registered trademark)) receiver 118, a load sensor 119, a position sensor 120, an HUD display on/off sensor 121, an HUD mirror adjustment sensor 122, and so on. However, all of those devices are not always provided, and other types of device may be provided. The vehicle information 50 that can be acquired by the provided devices may be appropriately used.

The vehicle speed sensor 101 acquires speed information of the vehicle 1. The shift position sensor 102 acquires current gear information of the vehicle 1. The steering wheel angle sensor 103 acquires steering wheel angle information. The headlight sensor 104 acquires lamp lighting information relating to on/off of the headlight. The illuminance sensor 105 and the chromaticity sensor 106 acquire external light information. The ranging sensor 107 acquires distance information between the vehicle 1 and an external object. The infrared sensor 108 acquires infrared information relating to the presence or absence of the object and a distance to the object at a short distance of the vehicle 1. The engine start sensor 109 detects engine on/off information.

The acceleration sensor 110 and the gyro sensor 111 acquire acceleration gyro information including acceleration and angular velocity as information on a posture and behavior of the vehicle 1. The temperature sensor 112 acquires temperature information inside and outside the vehicle 1. The road-to-vehicle communication wireless receiver 113 and the vehicle-to-vehicle communication wireless receiver 114 acquire road-to-vehicle communication information received by a road-to-vehicle communication between the vehicle 1 and roads, signs, signals, and the like, and a vehicle-to-vehicle communication information received by a vehicle-to-vehicle communication between the vehicle 1 and other surrounding vehicles, respectively.

The camera (inside of the vehicle) 115 and the camera (outside of the vehicle) 116 capture moving images of situations inside of and outside of the vehicle, respectively, and acquire camera image information (inside of the vehicle/outside of the vehicle). The camera (inside of the vehicle) 115 images, for example, a posture of the driver, the position and movement of the eyes, and so on. The obtained moving image is analyzed, thereby being capable of grasping a fatigue situation of the driver, the position of a visual line, and so on. Also, the camera (outside of the vehicle) 116 images surrounding situations of the front and rear of the vehicle 1. The obtained moving image is analyzed, thereby being capable of grasping, for example, the presence or absence of moving objects such as other vehicles and persons around the vehicle 1, buildings and terrain, and road surface conditions (rain and snow cover, freezing, irregularities, or the like) and the like.

The GPS receiver 117 and the VICS receiver 118 acquire GPS information obtained by receiving a GPS signal and VICS information obtained by receiving a VICS signal, respectively. The GPS receiver 117 and the VICS receiver 118 may be implemented as a part of a car navigation system acquiring and using those pieces of information.

The load sensor 119 and the position sensor 120 detect the position and posture of the driver. The HUD display on/off sensor 121 detects whether a power supply of the HUD is on or off. The HUD mirror adjustment sensor 122 detects an adjustment signal of the HUD mirror and acquires information as to whether a mirror adjustment process is to be executed or not.

In addition, although various types of sensors exist outside the HUD, the sensors (121, 122, and so on) related to the HUD may be provided inside the HUD.

Figure 4:
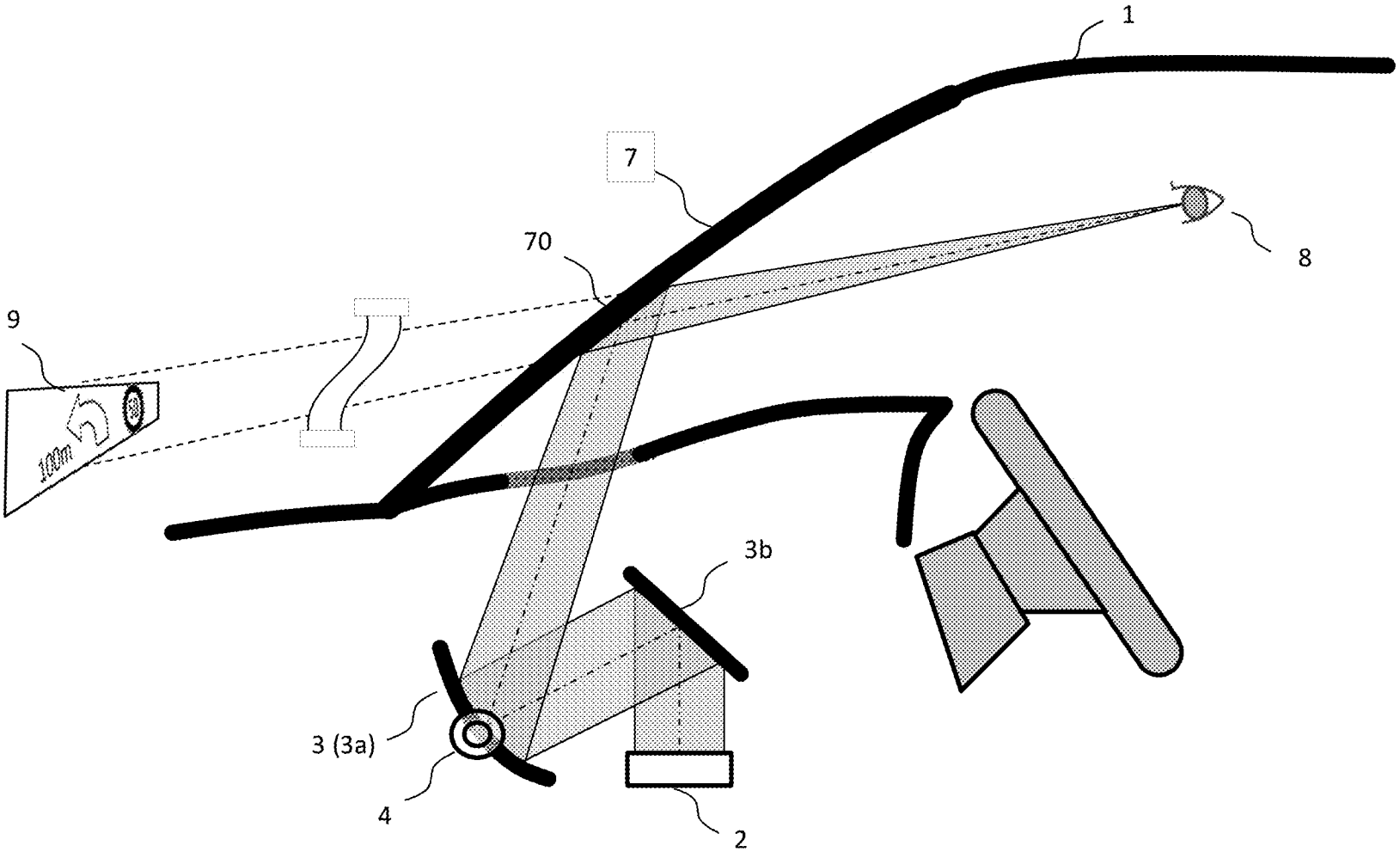
FIG. 4 is a schematic diagram showing an image display state by the head up display.

FIG. 4 is a schematic diagram showing an image display state by the HUD. An image light for display is emitted from the image display device 2 installed at a bottom of a dashboard of the vehicle 1. The image light is reflected by a first mirror 3b and a second mirror 3a (for example, a concave mirror, a free curved surface mirror, a mirror having an asymmetric shape in an optical axis, or the like), and projected toward the windshield 7. The first mirror 3b is fixed and the second mirror 3a is rotatable by the mirror drive unit 4. In the following description, the second mirror 3a will be simply referred to as "mirror 3".

The image light converged and projected from the mirror 3 is reflected by the windshield 7, enters the driver's eyes 8, and forms an image on a retina so that the image can be visually recognized. In this situation, the driver looks at the virtual image 9 existing in front of the windshield 7. A reflection position of the image light in the windshield 7 is indicated by reference numeral 70. In other words, the driver looks at the virtual image 9 in a forward direction of the reflection position 70.

Figure 5:
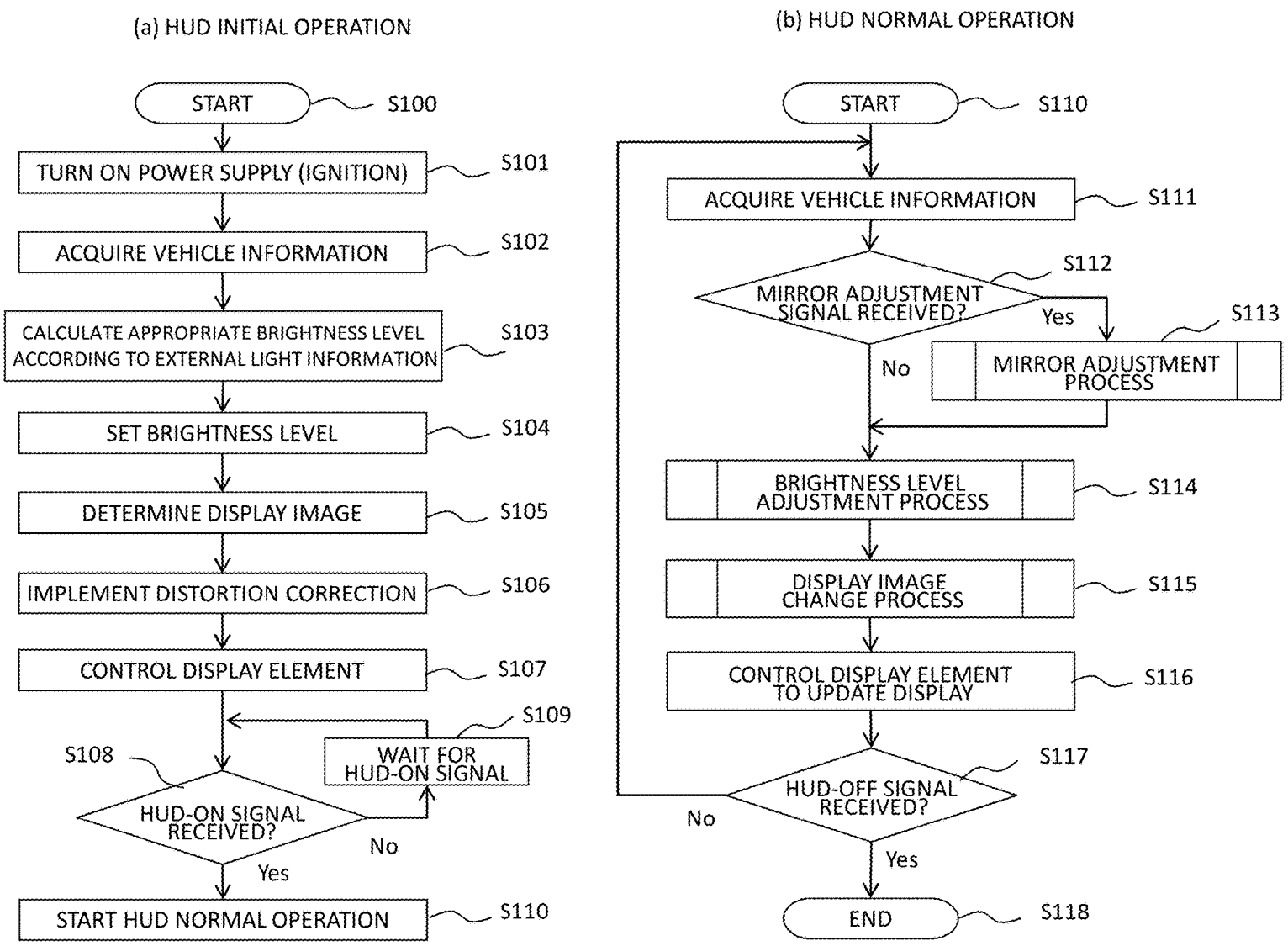
FIG. 5 are flowcharts showing a basic operation of the head up display.

FIG. 5 are flowcharts showing a basic operation of the HUD. FIG. 5A shows an initial operation and FIG. 5B shows a normal operation including various types of adjustments. The following processing is controlled by the electronic control unit (ECU) 11, and the details of the processing will be described along the flow.

In an initial operation (S100) of (a), when receiving a signal indicating that a power supply (ignition) is on from the engine start sensor 109 (S101), the vehicle information acquisition unit 5 acquires the vehicle information 50 (S102). First, an appropriate brightness level is calculated according to the external light information by the illuminance sensor 105 (S103), and the light source adjustment unit 15 is controlled to set the brightness level of the light source 21 (S104). In addition, the information (for example, current vehicle speed information) selected by the driver is extracted from the acquired vehicle information 50 to determine the image to be displayed (S105). The correction of the image distortion caused by the projection optical system (for example, a curved surface shape of the windshield 7) is implemented on the display image by the distortion correction unit 16 (S106). The drive signal is supplied to the display element 23 by the display element drive unit 17 (S107). It is determined whether the on signal has been received or not, by the HUD display on/off sensor 121 (S108), and the processing waits for the reception of the on signal (S109). Upon receiving the on signal, the light source 21 of the image display device 2 is turned on, and a projection display of the image, that is, the normal operation of the HUD starts (S110).

In the normal operation (S110) of FIG. 5B, the vehicle information 50 is subsequently acquired through the vehicle information acquisition unit 5 (S111). It is determined whether or not the mirror adjustment signal from the HUD mirror adjustment sensor 122 has been received (S112). If the mirror adjustment signal has been received, the mirror adjustment process is implemented (S113). In the mirror adjustment process, the angle or the like of the mirror 3 is adjusted by the mirror drive unit 4, and the details of the mirror adjustment process will be described later. Thereafter, a brightness level adjustment process (S114) of the display image and a display image change process (S115) are implemented, and the display element is controlled to update the display (S116), which will be described in detail later. It is determined whether the off signal has been received or not, by the on/off sensor 121 (S117), and the processing of S111 and the subsequent steps is repeated until receiving the off signal. Upon receiving the off signal, the light source 21 of the image display device 2 is turned off and the projection display of the image is completed (S118).

Figure 6:
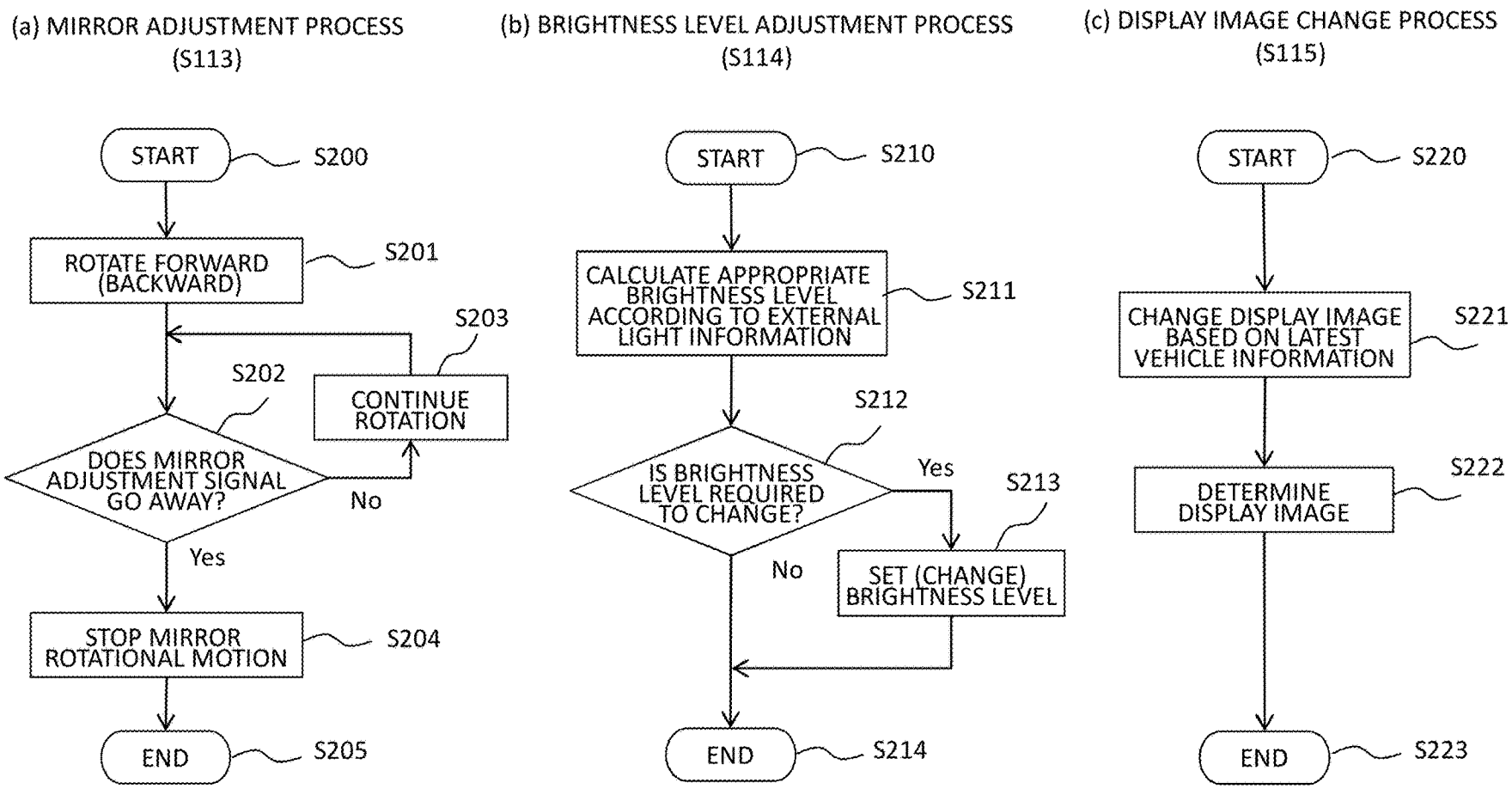
FIG. 6 are flowcharts showing the details of a process in FIG. 5.

FIG. 6 are flowcharts showing the details of the processing of FIG. 5, in which (a) shows the mirror adjustment process (S113), (b) shows the brightness level adjustment process (S114), and (c) shows the display image change process (S115).

In the mirror adjustment process (S200) of (a), upon receiving the mirror adjustment signal from the HUD mirror adjustment sensor 122 by the driver's operation, the mirror adjustment unit 18 determines the adjustment amount, and the mirror drive unit 4 rotates the mirror 3 in a forward direction (or a reverse direction) (S201). It is determined whether the mirror adjustment signal has disappeared or not (S202), and the mirror 3 is continued to rotate during a period of receiving the mirror adjustment signal (S203). When the driver stops the operation and the signal disappears, the rotation operation of the mirror 3 is stopped (S204) and the adjustment process is terminated (S205). The direction of rotation (forward/reverse) of the mirror 3 in S201 is selectable by the driver. Alternatively, the rotation direction (forward/reverse) may be automatically switched to the other when a rotation end is reached. As a result, the driver can adjust the mirror 3 to an optimum angle while watching the display image of the HUD In the brightness level adjustment process (S210) of (b), an appropriate brightness level is calculated according to the current external light information by the illumination sensor 105 (S211). It is determined whether a change in the brightness level is necessary or not (S212), and if the change is necessary (S212), the light source adjustment unit 15 is controlled to change and set the brightness level of the light source 21 (S213). With the above processing, the adjustment of the brightness level is terminated (S214), and thereafter the image is displayed at the changed brightness level.

In the display image change process (S220) of FIG. 6C, the content of the display image is changed based on the latest vehicle information 50 (S221). For example, the display speed is changed based on the current speed information from the vehicle speed sensor, and a guide arrow display is changed based on navigation information from the GPS receiver or the VICS receiver. It is needless to say that an item to be displayed is selectable by the driver, and when the item has been changed, the content of the display image is switched to the content corresponding to the new item. In the above manner, the display image based on the latest information is determined and supplied to the display element 23 (S222), and the change process is terminated (S223).

The above is the basic configuration and basic operation of the image display apparatus for a vehicle (head up display). Next, a mechanism for suitably adjusting the rotation and position of the mirror according to the position of the driver's eyes in the present invention will be described with reference to examples.

EXAMPLE 1

In an example 1, an example of a mirror adjustment mechanism of a head up display (HUD) according to the present invention will be described. For ease of understanding, the description will be given as compared with a conventional adjustment mechanism.

Figure 7:
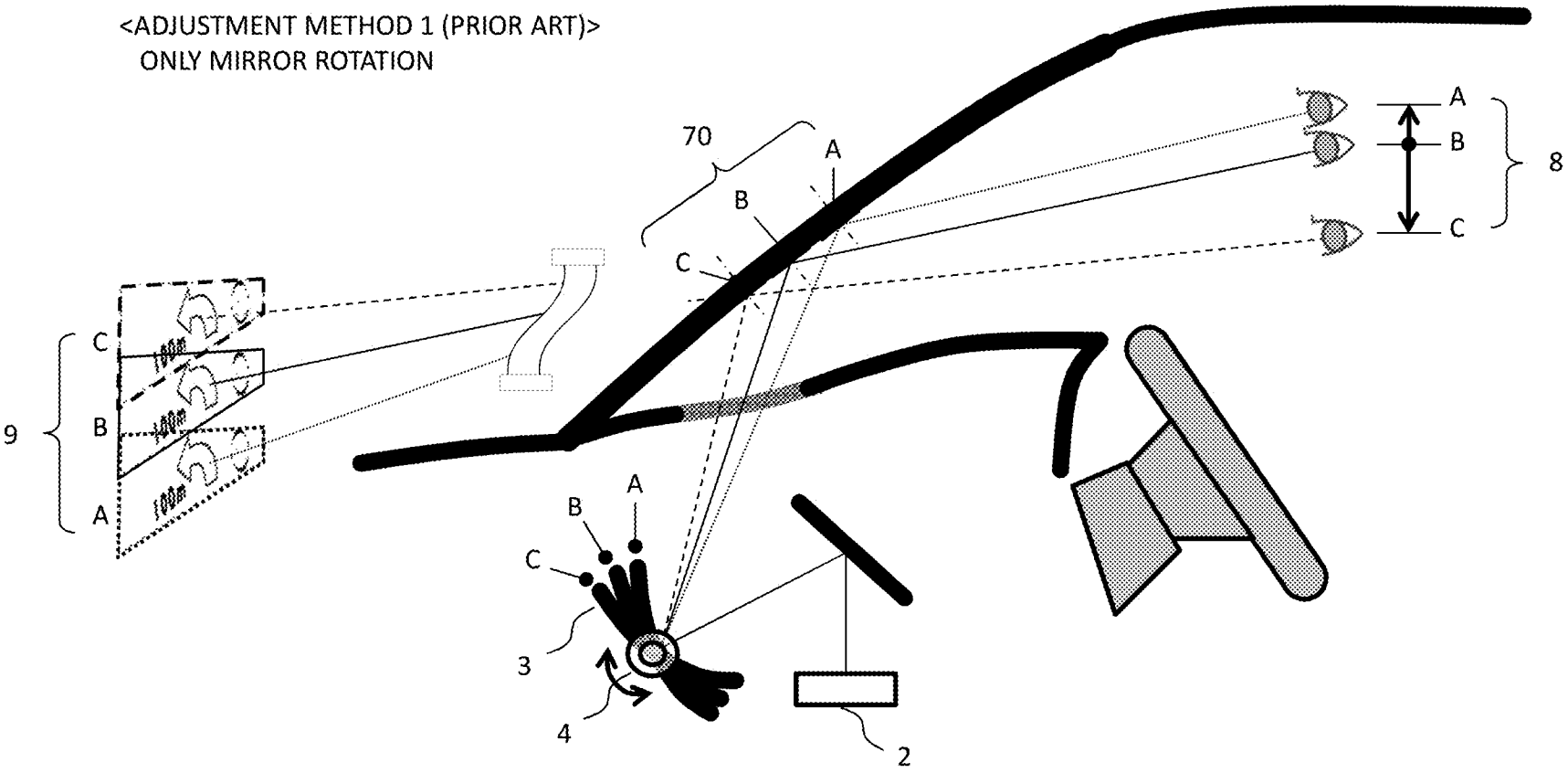
FIG. 7 is a diagram illustrating a conventional mirror adjustment method 1.

FIG. 7 is a diagram illustrating a conventional mirror adjustment method 1. The image light emitted from the image display device 2 is reflected by the mirror 3, reflected at the reflection position 70 of the windshield, and is incident on the driver's eyes 8, and the driver visibly recognizes the image light as the virtual image 9. When the position of the eyes 8 (hereinafter referred to as an eye point) changes to A, B, and C according to a height of the driver, there is a case in which the image light emitted from the image display device 2 cannot be incident on each eye point or there is a case in which a part of the image is lost even if the image light can be incident on the eye point. In order to cope with the above drawbacks, in the conventional adjustment method 1, a mechanism in which the mirror 3 is pivoted by the mirror drive unit 4 is employed. According to the above mechanism, the driver can visually recognize the virtual image 9 by adjusting the rotational position of the mirror 3 to A, B, and C according to the eye point of the driver.

However, in the above adjustment method 1, since only the rotation mechanism of the mirror is used, when the driver visually recognizes the display image, the following phenomena are involved as problems.

(1) Since the reflection position 70 of the windshield moves to A, B, or C, a position at which the visual line of the driver crosses the windshield moves.

(2) An angle (hereinafter referred to as a depression angle) of the visual line at which the driver looks down on the virtual image 9 changes.

(3) The position of the virtual image 9 visually recognized by the driver moves to A, B, and C.

Any of those movements (changes) will give the driver an uncomfortable feeling. In the case where the changes of (1) to (3) are large, since a part of a viewing field ahead of the windshield necessary for driving may be blocked, which is not preferable. Incidentally, although a mechanism for adjusting the entire HUD or the entire projection optical system up and down according to the eye point of the driver is also enabled, there is a disadvantage that a moving mechanism is increased in size.

Therefore, in the present example, the problems described above are solved by configuring not only the rotation mechanism of the mirror but also the moving mechanism of the mirror in the mirror drive unit 4. In other words, the position of the rotation axis of the mirror can be moved in the vertical direction and the front and rear direction by the mirror moving mechanism. Hereinafter, specific adjustment methods 2, 3, and 4 will be described.

Figure 8:
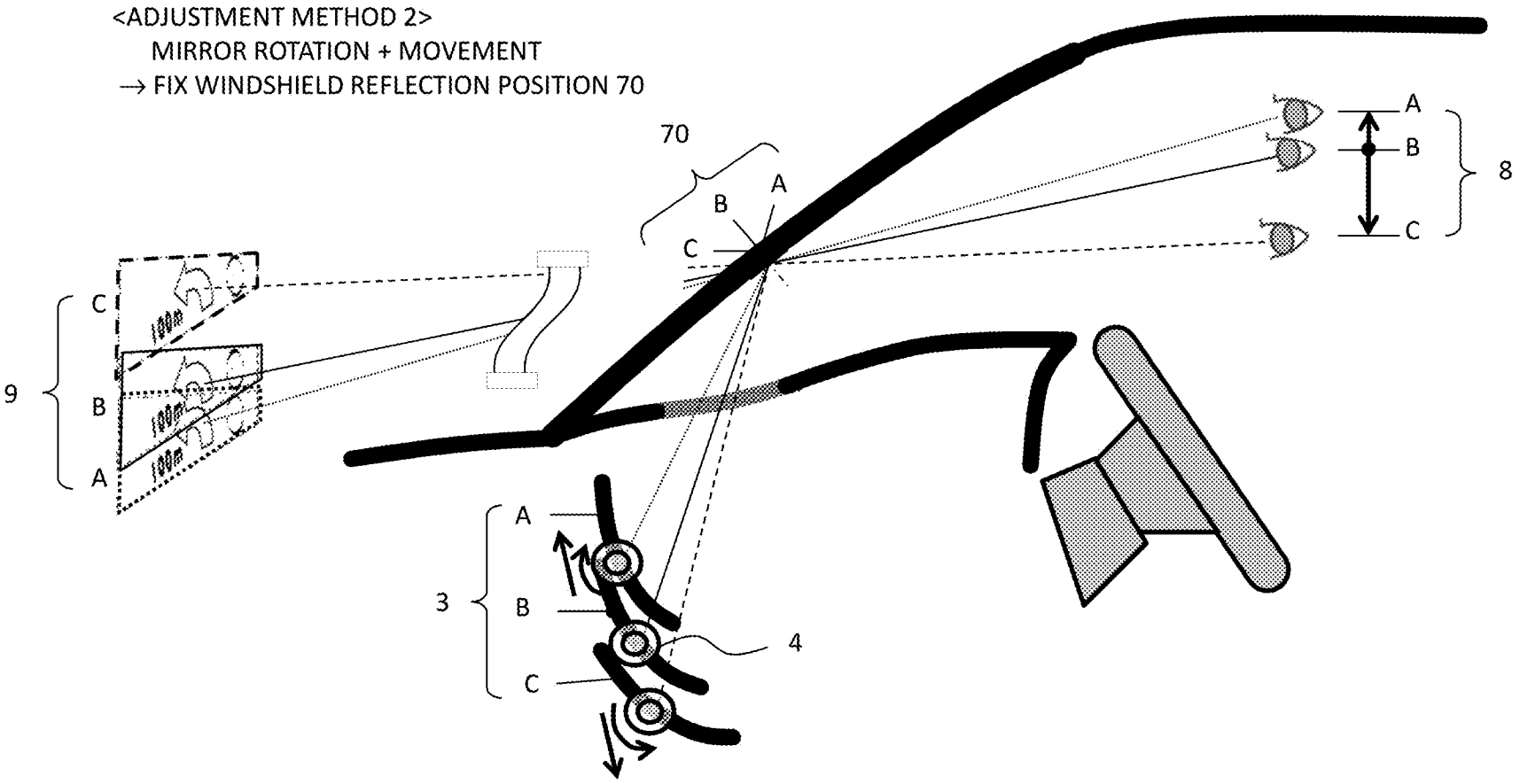
FIG. 8 is a diagram illustrating a mirror adjustment method 2 according to the present example (Example 1).

FIG. 8 is a diagram illustrating the mirror adjustment method 2 according to the present example. In the adjustment method 2, the reflection position 70 of the windshield is fixed in order to cope with the above problem (1).

The mirror drive unit 4 makes it possible to not only rotate the mirror 3, but also move the mirror rotation axis in the vertical direction and the front and rear direction. When the driver's eye point 8 changes to A, B, and C, the mirror drive unit 4 combines the rotation and movement of the mirror 3 together as shown in FIG. 8 to set the mirror 3 to states of A, B, and C. As a result, the reflection position 70 of the windshield can be fixed to one position without moving. Meanwhile, a specific example of the setting condition will be described later.

Figure 9:
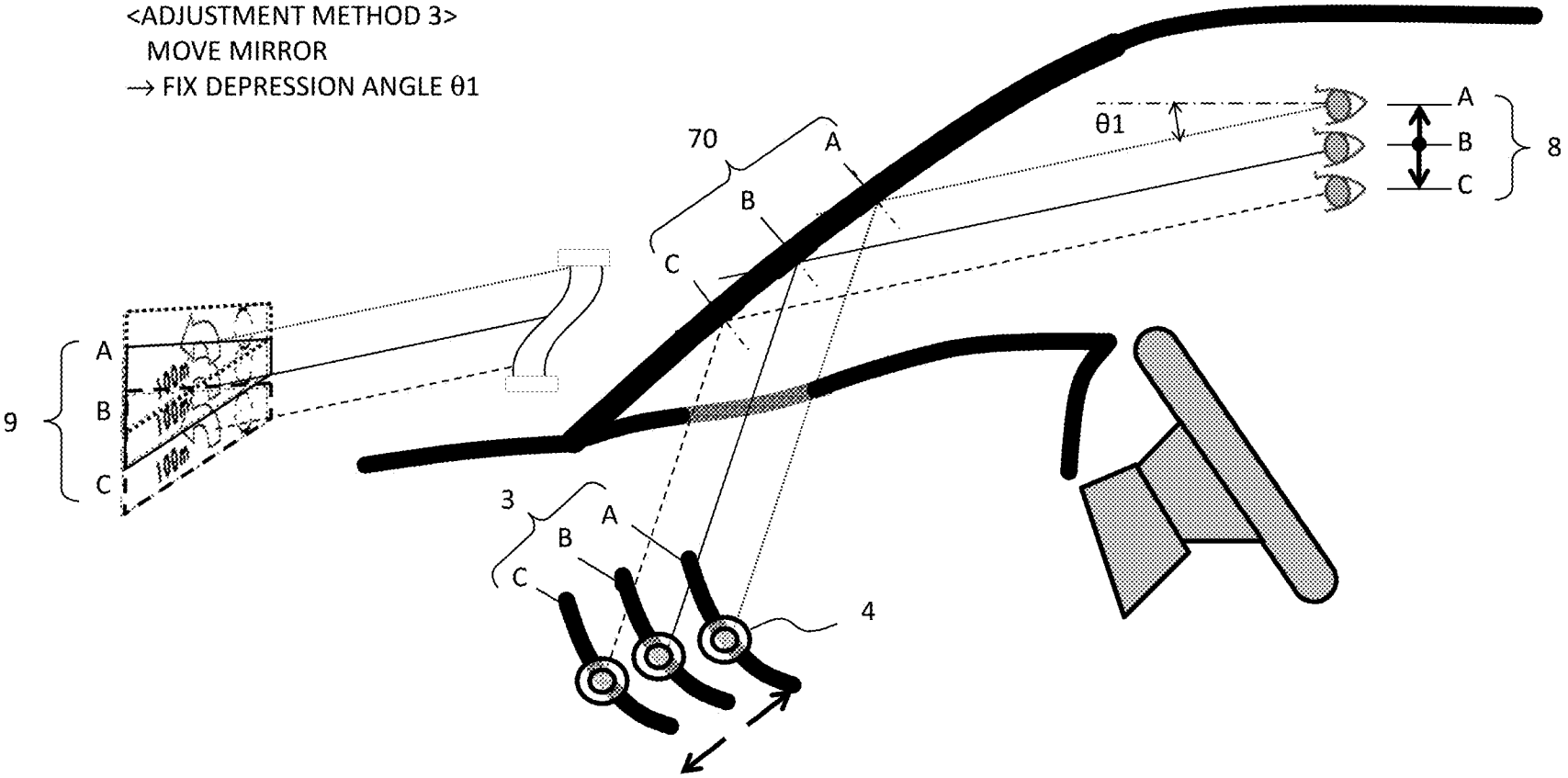
FIG. 9 is a diagram illustrating a mirror adjustment method 3 according to the present example.

FIG. 9 is a diagram illustrating the mirror adjustment method 3 according to the present example. In the adjustment method 3, in order to cope with the above problem (2), the depression angle of the driver is fixed.

When the driver's eye point 8 changes to A, B, and C, the mirror drive unit 4 moves the mirror 3 to the positions of A, B, and C while keeping the rotation angle of the mirror 3 constant as shown in FIG. 9, thereby being capable of fixing the depression angle θ1 of the driver at a fixed angle. A specific example of the setting condition in that case will also be described later.

Figure 10:
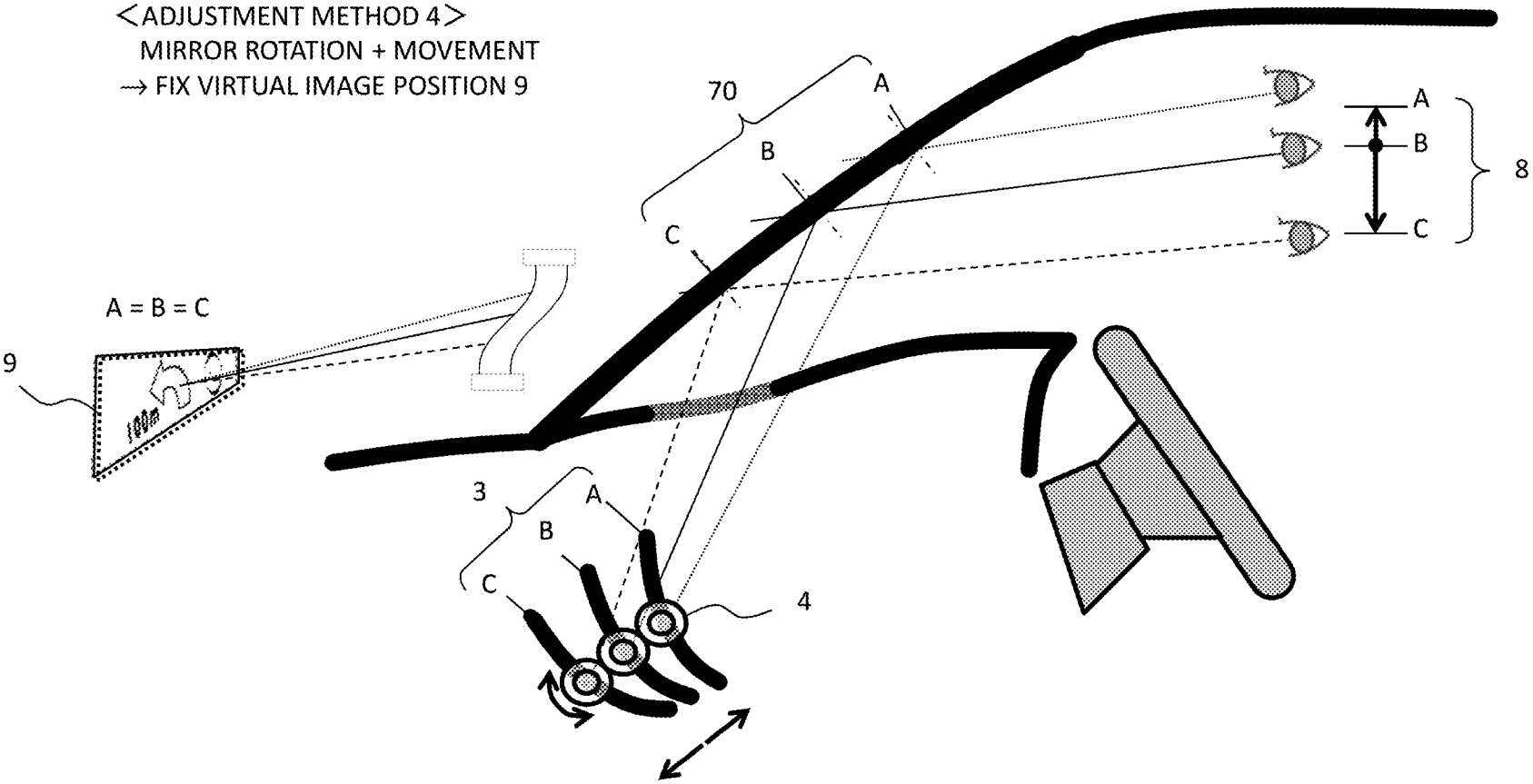
FIG. 10 is a diagram illustrating a mirror adjustment method 4 according to the present example.

FIG. 10 is a diagram illustrating the mirror adjustment method 4 according to the present example. In the adjustment method 4, in order to cope with the above problem (3), the position of the virtual image 9 visually recognized by the driver is fixed.

When the driver's eye point 8 changes to A, B, and C, the rotation and movement of the mirror 3 are combined together as shown in FIG. 10 to set the mirror 3 in the states of A, B, and C, thereby being capable of fixing the position of the virtual image 9 visually recognized by the driver. A specific example of the setting condition in that case will also be described later.

As described above, according to the adjustment methods 2 to 4, the problems (1), (2) and (3) with the conventional art can be solved by combining the moving mechanism of the mirror 3. Also, the driver can select an appropriate method from the adjustment methods 2 to 4 according to the driving condition and the visibility condition and implement the selected method (in this situation, the adjustment method 1 may be included in an option).

Figure 11:
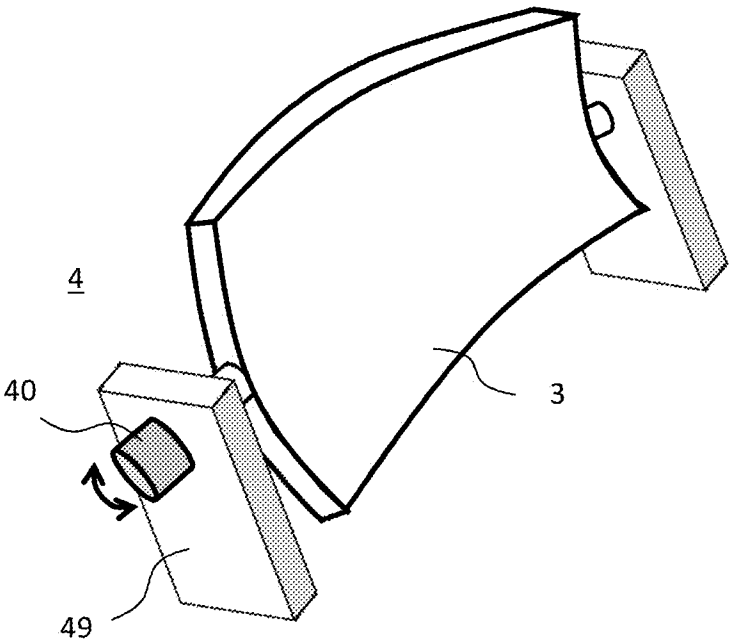
FIG. 11 are diagrams showing an example of an adjustment mechanism of a mirror drive unit 4.
Figure 11:
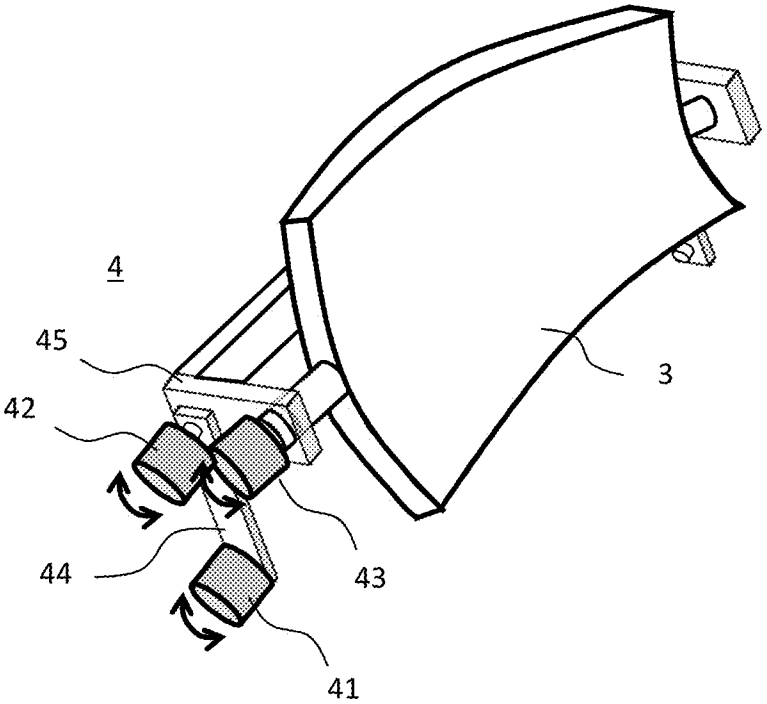

FIG. 11 are diagram showing an example of the adjustment mechanism of the mirror drive unit 4. (a) shows a case of the conventional adjustment method 1, and (b) shows a case of the adjustment methods 2 to 4 in the present example.

In the conventional adjustment mechanism of (a), the mirror drive unit 4 is configured to rotate the mirror 3 with a single rotary motor 40 which is attached to a fixed arm 49. In contrast to the conventional adjustment mechanism, in the adjustment mechanism of the present example in (b), the mirror drive unit 4 is configured to rotate and move the mirror 3 with the use of three rotary motors 41, 42, 43 and two movable arms 44, 45.

Figure 12:
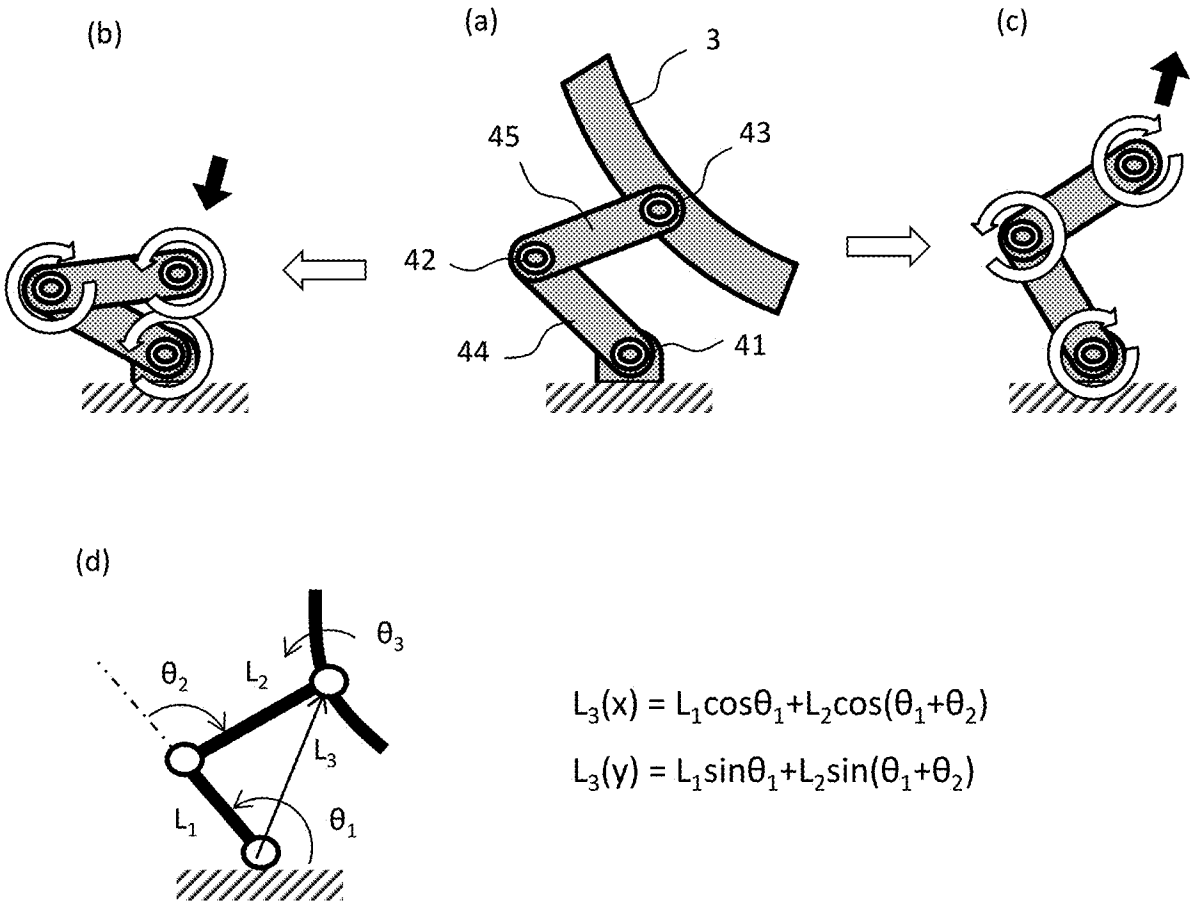
FIG. 12 are diagrams illustrating an adjustment operation by the adjustment mechanism of FIG. 11(b).

FIG. 12 are diagrams illustrating the adjustment operation by the adjustment mechanism in FIG. 11(b). As shown in (a), the mirror 3 is attached to the rotary motor 43, and the rotary motor 43 is fixed to a housing through a link mechanism including the movable arms 44, 45 and the two rotary motors 41, 42. The rotary motors are rotated in a predetermined direction, thereby being capable of descending a height position of the mirror 3 as shown in (b) and ascending the height position of the mirror 3 as shown in (c). (d) shows a movement position $L_3$ (x, y) of the mirror 3 by a calculation formula, in which the mirror 3 can be moved to a desired position according to lengths $L_1$ and $L_2$ of the movable arms 44 and 45 and rotation angles $\theta_1$ and $\theta_2$ of the rotary motors 41 and 42. It is needless to say that the rotation angle of the mirror 3 is given by the rotation angle $\theta_3$ of the rotary motor 43.

Since the mirror adjustment mechanism shown in this example can be realized with a simple structure, the HUD apparatus can be easily mounted on the vehicle without being increased in size.

Hereinafter, analysis results of the adjustment amount (position and rotation angle) of the mirror 3 to follow a change in the position of the eye point are shown in the respective adjustment methods 1 to 4.

Figure 13:
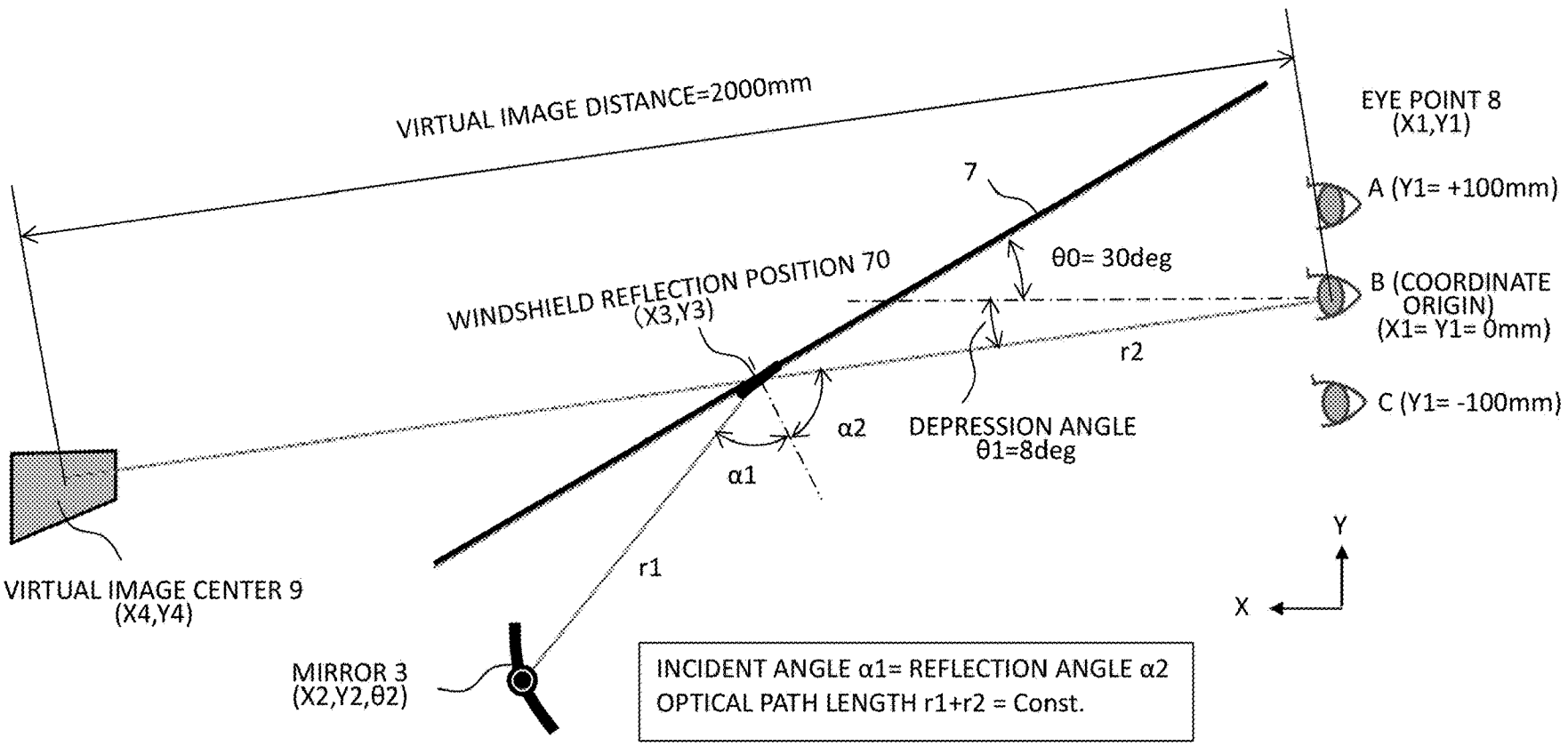
FIG. 13 is a diagram showing an analysis model of a mirror adjustment mechanism.

FIG. 13 is a diagram showing an analysis model of the mirror adjustment mechanism. In the analysis, when the coordinates of the eye point 8 are set to (X1, Y1), and a height is changed to A (Y1=+100 mm), B (Y1=0 mm) and C (Y1=−100 mm) in a height direction, coordinates (X2, Y2) and a rotation angle (θ2) of the mirror 3 to follow the change of the eye point 8 are obtained. Further, changes in coordinates (X3, Y3) of the reflection position 70 of the windshield, center coordinates (X4, Y4) of the virtual image 9, and a depression angle (θ1) at which to look down on the virtual image 9 at that time are calculated.

The preconditions for the analysis are assumed to be 2000 mm in a distance to the virtual image 9, 30 deg. in an inclination angle θ0 of the windshield 7, 8 deg. in a depression angle θ1 at a reference position (position B) of the eye point, and the windshield made of a flat glass. The conditions for allowing the image to be normally visually recognized at each eye point are that an incident angle α1 and a reflection angle α2 of the image light at the windshield reflection position 70 are equal to each other and an optical path length r1+r2 is kept constant.

Figure 14A:
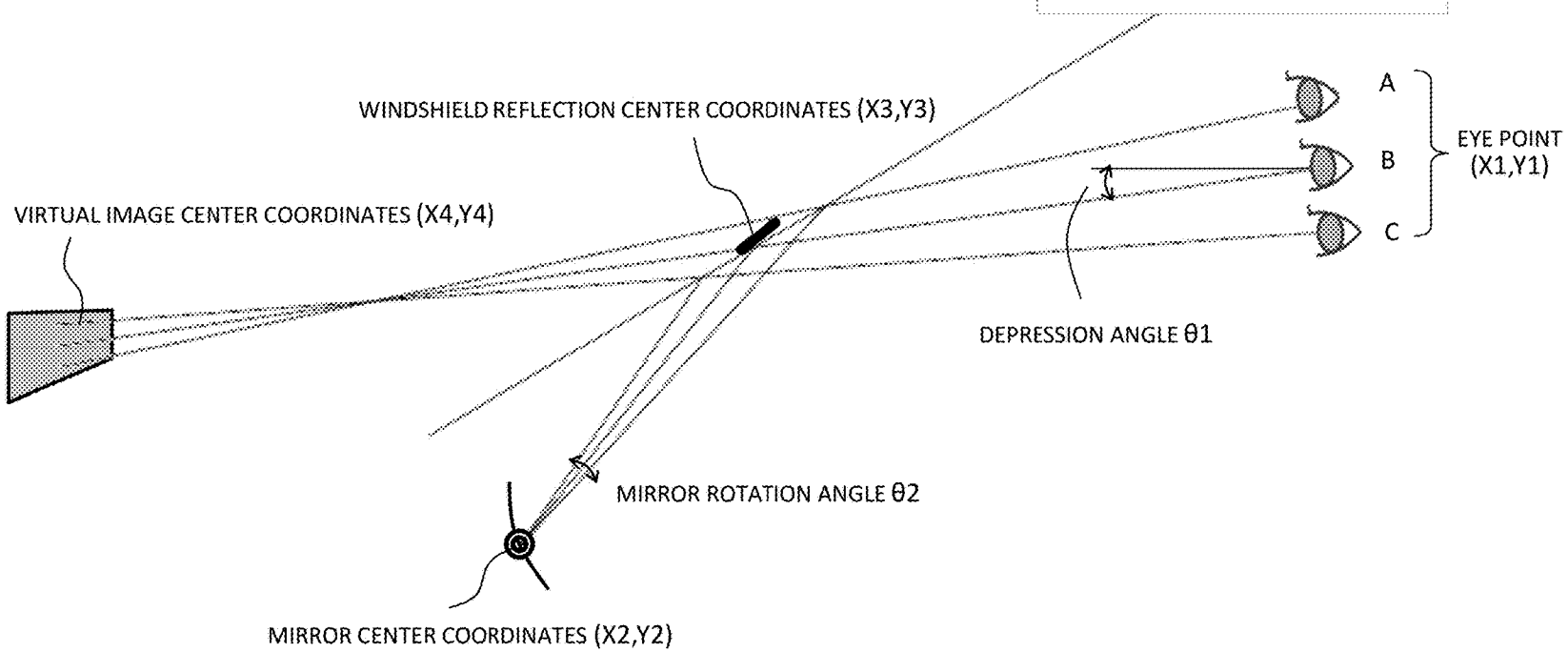
FIG. 14A is a diagram showing analysis results in the case of the mirror adjustment method 1 (conventional).
Figure 14B:
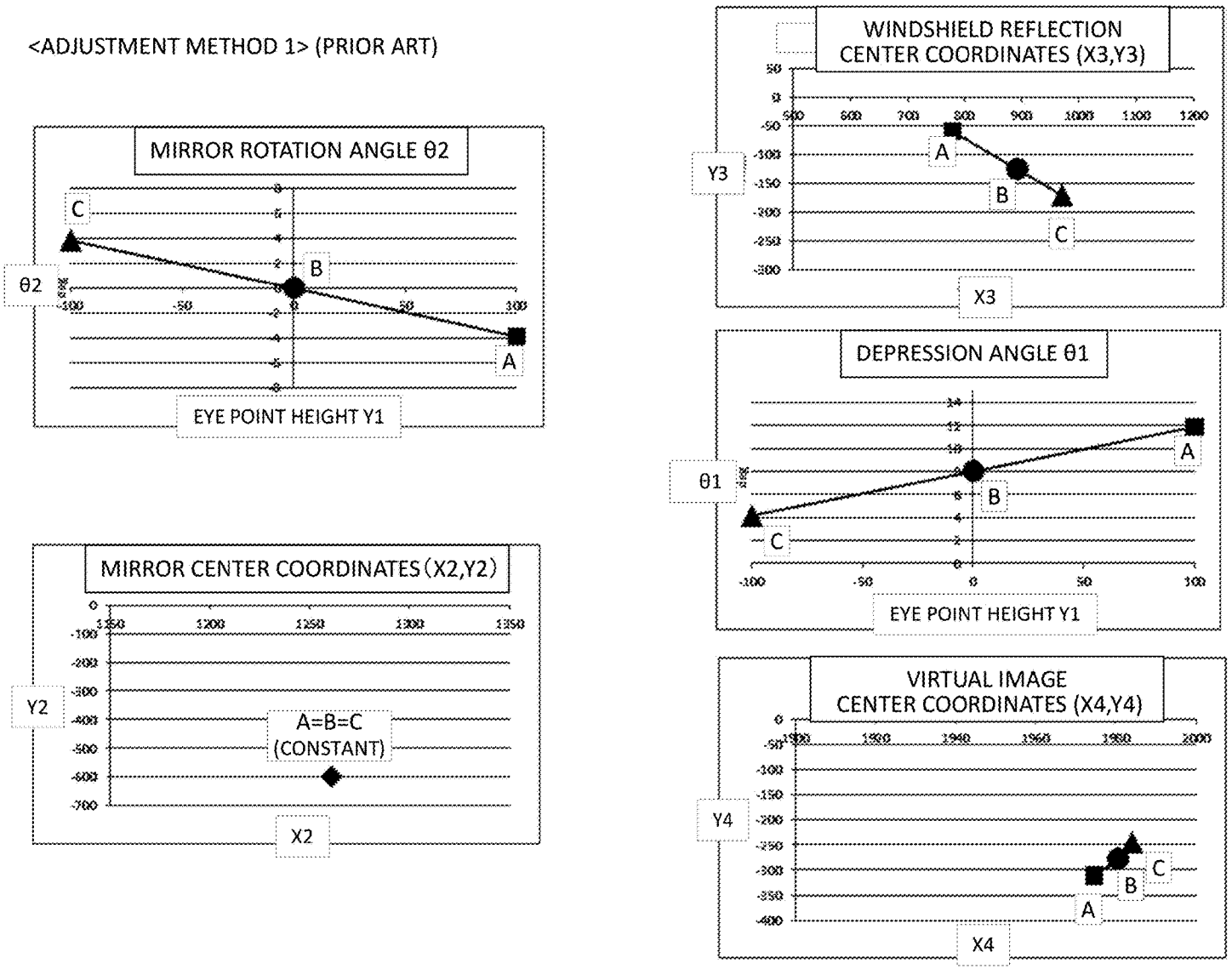
FIG. 14B is a diagram showing the analysis results in the case of the mirror adjustment method 1 (conventional).

FIGS. 14A and 14B show the analysis results in the case of the mirror adjustment method 1 (conventional) in FIG. 7. The analysis results for the respective eye points A, B, and C are shown in a table in FIG. 14A and shown in a graph in FIG. 14B. In the adjustment method 1, the center coordinates (X2, Y2) of the mirror are fixed and only the rotation angle (θ2) of the mirror is changed. For that reason, all of the windshield reflection center coordinates (X3, Y3), the depression angle (θ1), and the virtual image center coordinates (X4, Y4) are changed.

Figure 15A:
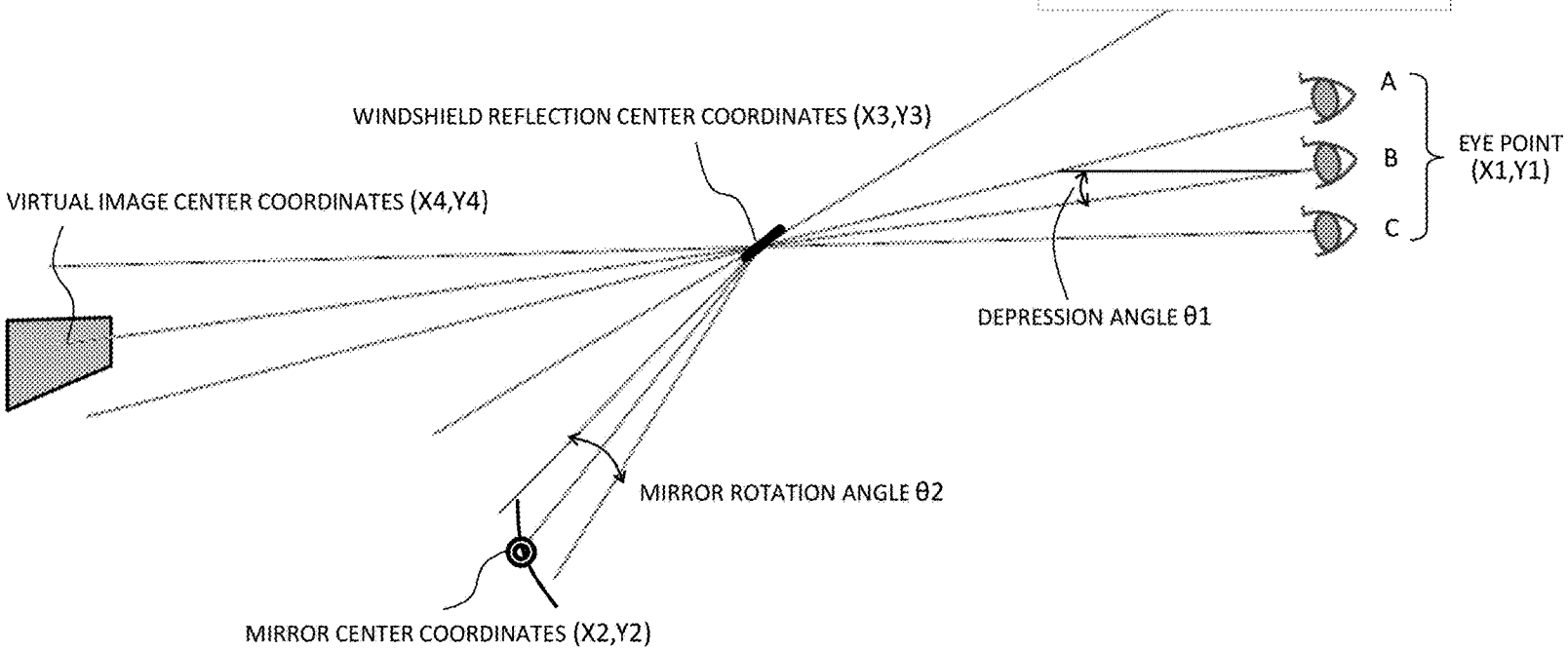
FIG. 15A is a diagram showing analysis results in the case of the mirror adjustment method 2 (the present example).
Figure 15B:
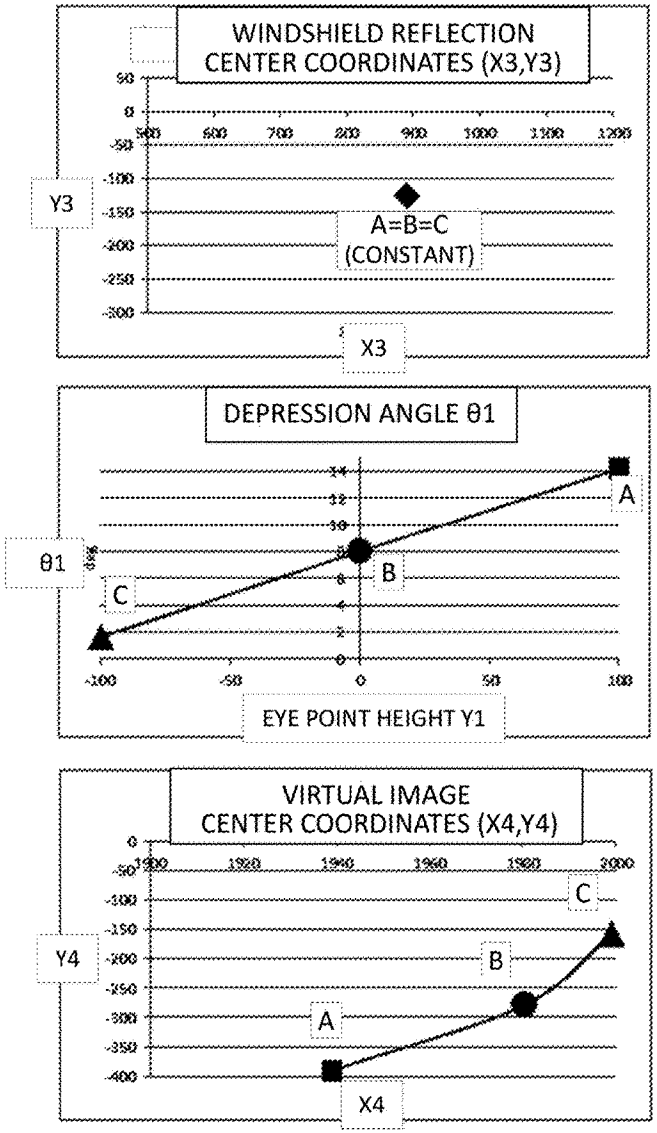
FIG. 15B is a diagram showing the analysis results in the case of the mirror adjustment method 2 (the present example).
Figure 15B:
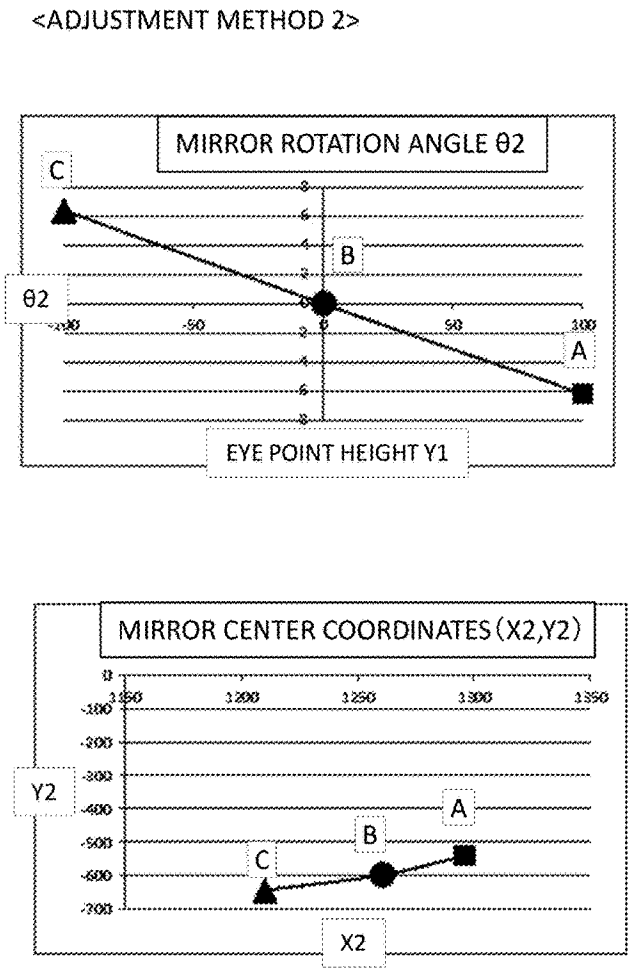

FIGS. 15A and 15B show the analysis results in the case of the mirror adjustment method 2 (one of the examples) of FIG. 8. The analysis results for the respective eye points A, B, and C are shown in a table in FIG. 15A, and shown in a graph in FIG. 15B. In the adjustment method 2, the center coordinates (X2, Y2) of the mirror and the rotation angle (θ2) of the mirror are changed so that the windshield reflection center coordinates (X3, Y3) are kept constant.

Figure 16A:
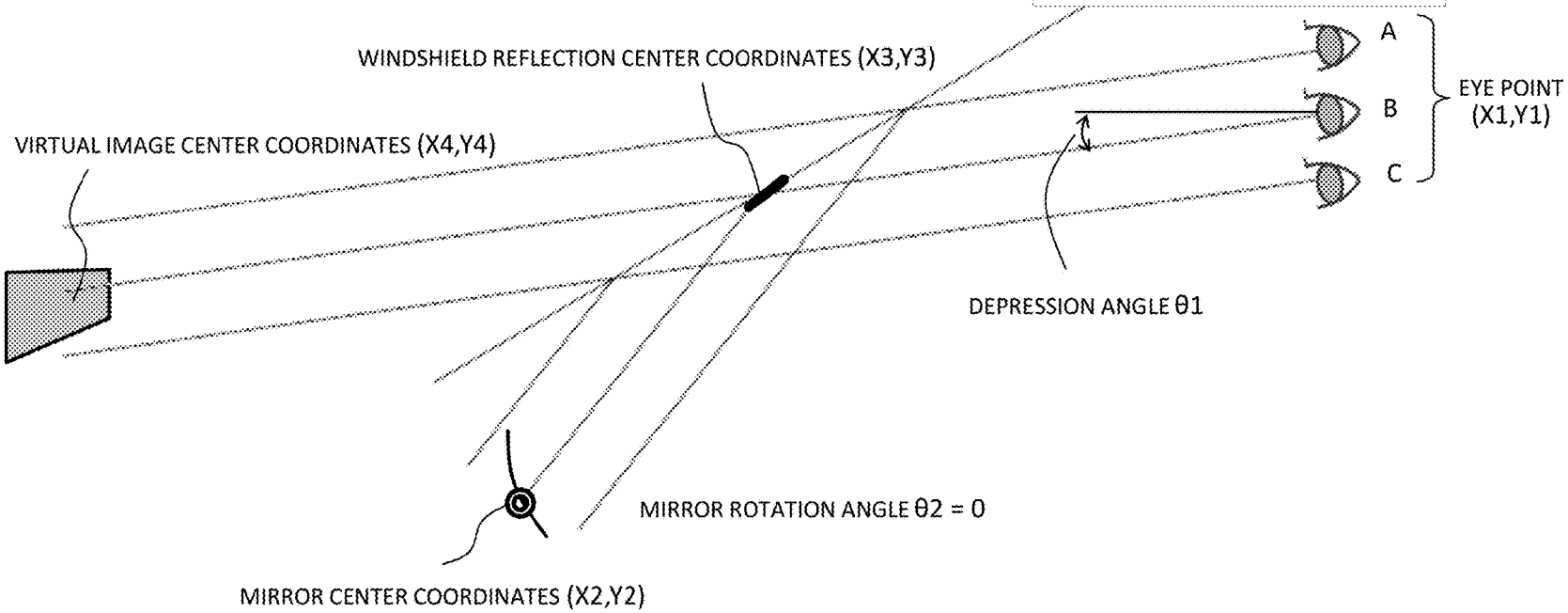
FIG. 16A is a diagram showing analysis results in the case of the mirror adjustment method 3 (the present example).
Figure 16B:
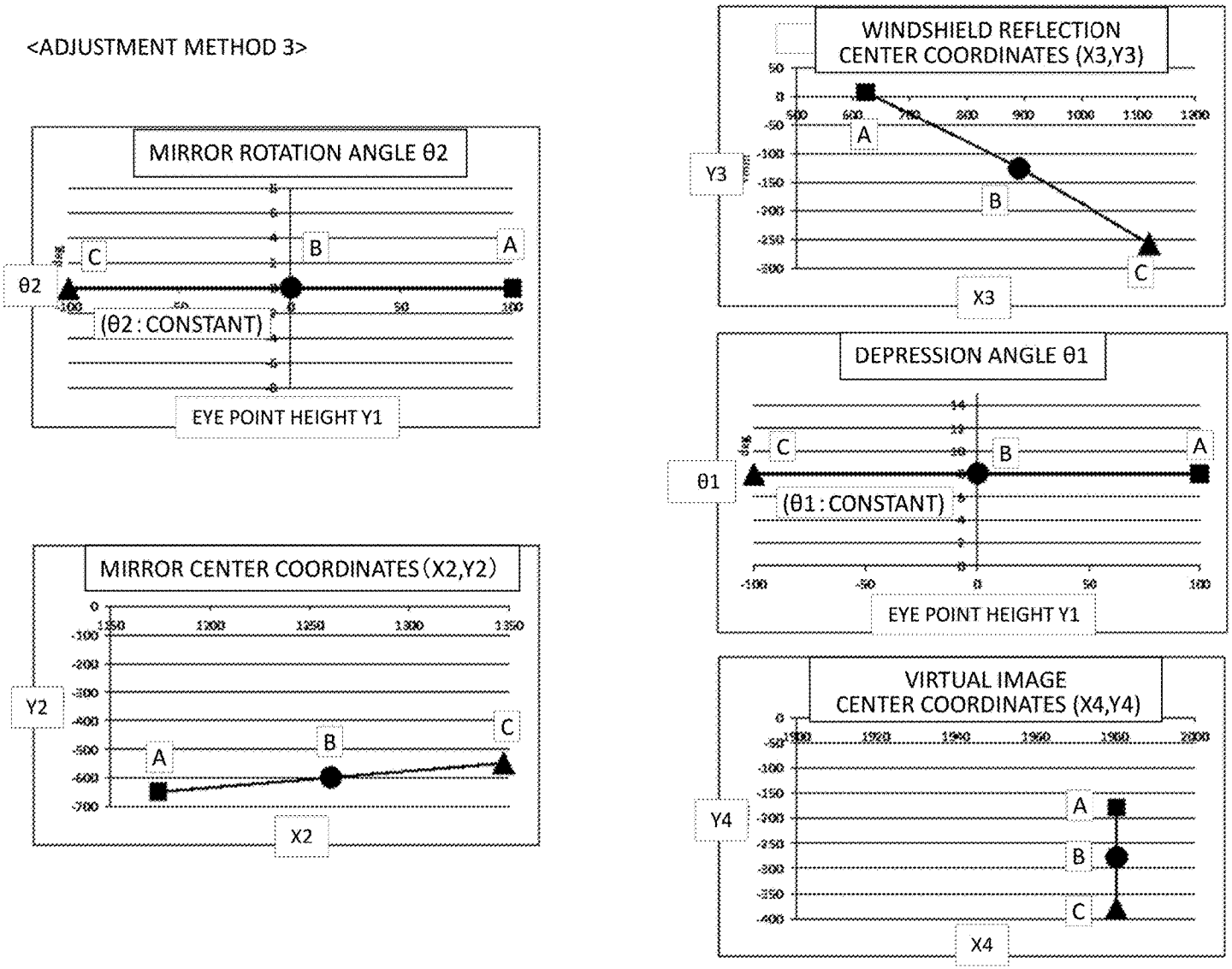
FIG. 16B is a diagram showing the analysis results in the case of the mirror adjustment method 3 (the present example).

FIGS. 16A and 16B show the analysis results in the case of the mirror adjustment method 3 (one of the examples) of FIG. 9. The analysis results for the respective eye points A, B, and C are shown in a table in FIG. 16A, and shown in a graph in FIG. 16B. In the adjustment method 3, the center coordinates (X2, Y2) of the mirror are changed so that the depression angle (θ1) is kept constant. In that method, the rotation angle (θ2) of the mirror is kept constant.

Figure 17A:
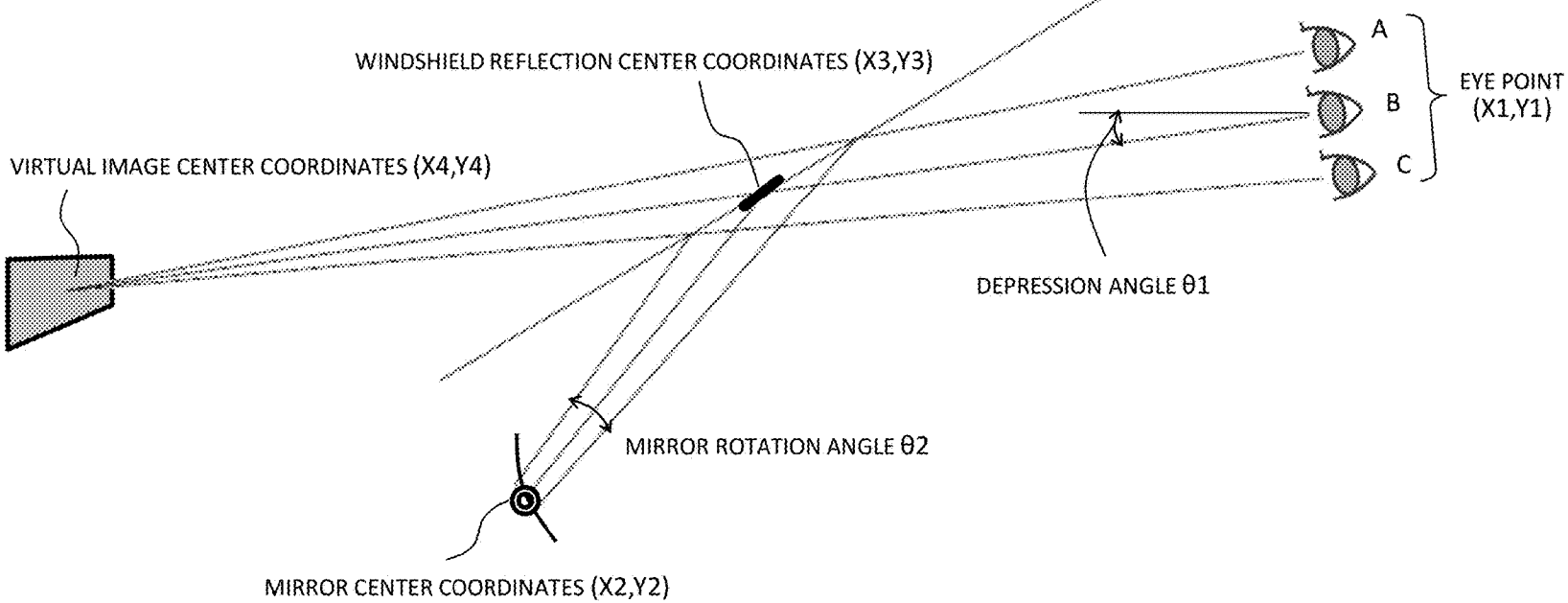
FIG. 17A is a diagram showing analysis results in the case of the mirror adjustment method 4 (the present example).
Figure 17B:
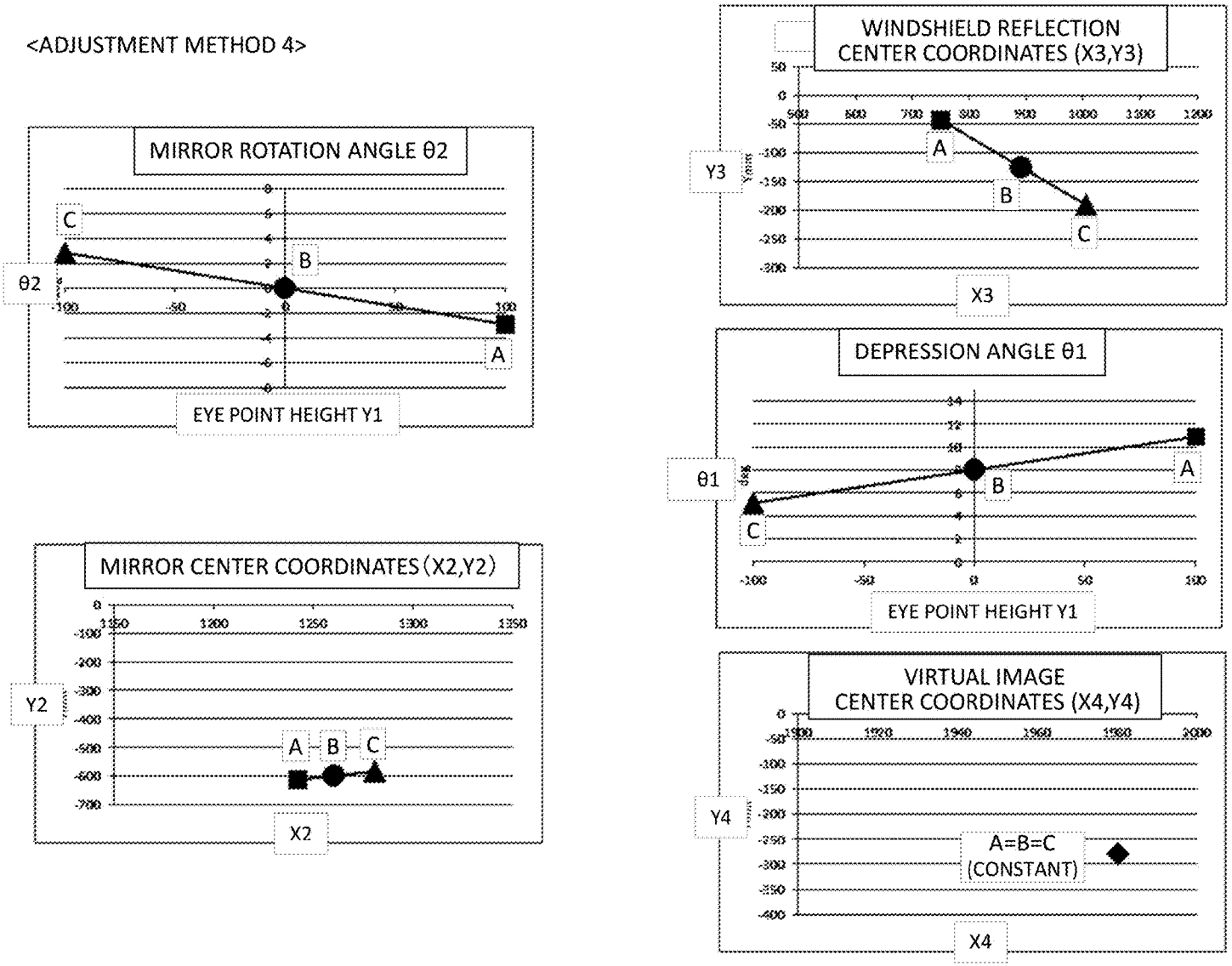
FIG. 17B is a diagram showing the analysis results in the case of the mirror adjustment method 4 (the present example).

FIGS. 17A and 17B show the analysis results in the case of the mirror adjustment method 4 (one of the examples) of FIG. 10. The analysis results for the respective eye points A, B, and C are shown in a table in FIG. 17A, and shown in a graph In FIG. 17B. In the adjustment method 4, the center coordinates (X2, Y2) of the mirror and the rotation angle (θ2) of the mirror are changed so that the virtual image center coordinates (X4, Y4) are kept constant.

In this manner, the adjustment amounts of the center coordinates (X2, Y2) and the rotation angle (θ2) of the mirror to follow the change in the eye point are different among the respective adjustment method 2 to 4 and values of the center coordinates (X2, Y2) and the rotation angle (θ2) are required to be changed in conjunction with each other. Therefore, in the mirror adjustment unit 18, the adjustment amounts of the center coordinates (X2, Y2) and the rotation angle (θ2) of the mirror corresponding to each position of the eye points in each adjustment method are stored in association with each other, and the center coordinates (X2, Y2) and the rotation angle (θ2) are adjusted while keeping the relationship of the adjustment amount between the center coordinates (X2, Y2) and the rotation angle (θ2). Incidentally, it is assumed that the driver determines an optimum adjustment amount (coordinates and rotation angle) of the mirror while viewing the display image. In other words, the mirror adjustment unit 18 acquires an operation signal from the driver from the HUD mirror adjustment sensor 122, and determines an end point of the adjustment operation.

In the respective analyses described above, the case in which the eye point changes in the height direction (Y direction) has been described, but also in the case where the eye point changes in the anteroposterior direction (X direction), the same mirror adjustment as that in the respective adjustment methods 2 to 4 can be performed by applying the analysis method described with reference to FIG. 13.

According to the first example, since the mirror can be adjusted so that the windshield reflection position and the virtual image position do not move even if the position of the driver's eyes changes, the driver can view the image more suitably without any uncomfortable feeling. Since the mirror adjustment mechanism used in the above example can be realized with a simple structure, the apparatus can be easily mounted on the vehicle without an increase in the size.

EXAMPLE 2

In the example 1, the configuration in which the optimum position in the mirror adjustment is determined while the driver views the image, that is, a manual adjustment method is employed. On the contrary, in an example 2, a method in which the position of the driver's eyes is calculated, and the position of the mirror is automatically adjusted to an optimum state according to the calculated position of the driver's eyes. In the present example, in order to detect the position of the driver's eyes, the centroid position of the driver is obtained according to the position and load of the driver, and the position of the eyes is calculated according to the centroid position.

As a result, when the driver changes to another driver, or when the driver's posture changes even with the same driver, the most visible image display can be performed by following the position of the driver's eyes at that time. It should be noted that the adjustment mechanism of the mirror employs the respective adjustment methods described in the example 1, and the mirror drive unit 4 is configured to adjust the coordinates of the mirror and the rotation angle in conjunction with each other.

Figure 18:
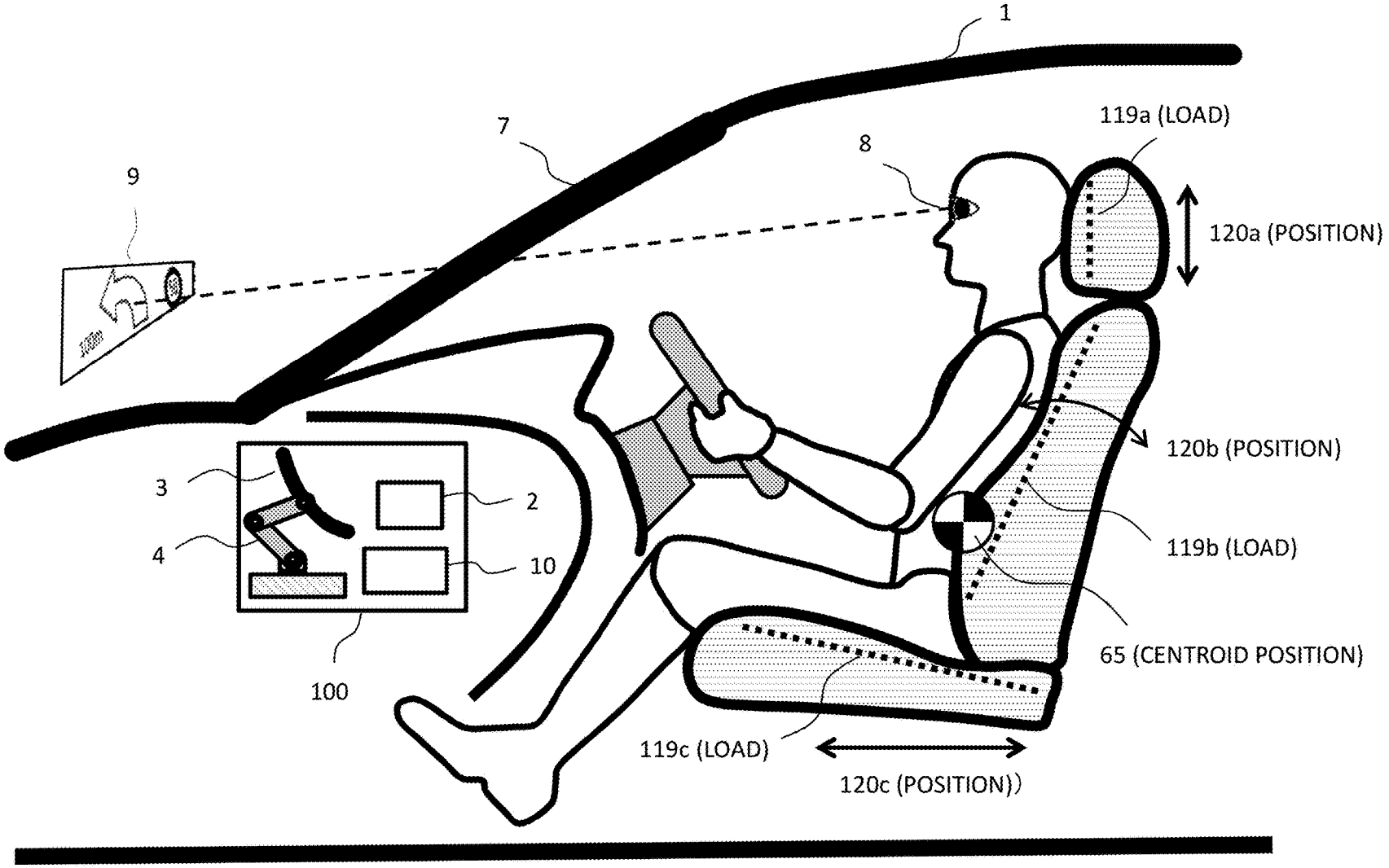
FIG. 18 is a diagram showing an example of various sensors in the vehicle used for automatic mirror adjustment (Example 2).

FIG. 18 is a diagram showing an example of various sensors in the vehicle used for automatic mirror adjustment. Load sensors (load cells, displacement sensors, and so on) 119 for detecting a load of the driver are each disposed in a headrest 119a, a back surface 119b, and a seat 119c of the driver's seat. In addition, position sensors 120 that detect the position of the driver are each disposed in a headrest (height position) 120a, a back surface (inclination) 120b, and a seat surface (anteroposterior position) 120c. With the above configuration, the centroid calculation unit 19 in the control unit 10 calculates a driving posture and physique information (height, weight) of the driver to derive a centroid position 65 of the driver and the position of the eye point 8. In this example, a relationship between the centroid position 65 and the eye point 8 is estimated based on the physique information.

If the position of the eye point 8 is known, as described in the example 1, the mirror adjustment unit 18 calculates the mirror adjustment amount and optimally adjusts the position and angle of the mirror 3 through the mirror drive unit 4. Since the mirror adjustment unit 18 stores the optimum adjustment amount (coordinates and rotation angle) of the mirror corresponding to each position of the eye point 8 in advance, the mirror adjustment unit 18 can automatically adjust the mirror to the optimum state. Further, the mirror adjustment unit 18 monitors the centroid position of the driver during the operation. When the centroid position is deviated, the mirror adjustment unit 18 determines that the eye point position is also changed, and automatically corrects the mirror to the optimum state while following the eye point position.

The deviation direction of the centroid position, that is, the deviation direction of the eye point can be not only the height direction but also the anteroposterior direction and the right and left direction as viewed from the driver. Coping with the deviation in the height direction is described in the example 1. The mirror can be adjusted optimally for the change in the anteroposterior direction. In the case of a change in the right and left direction, since distortion occurs in the image viewed by the driver, the image correction process is performed by the distortion correction unit 16.

Figure 19:
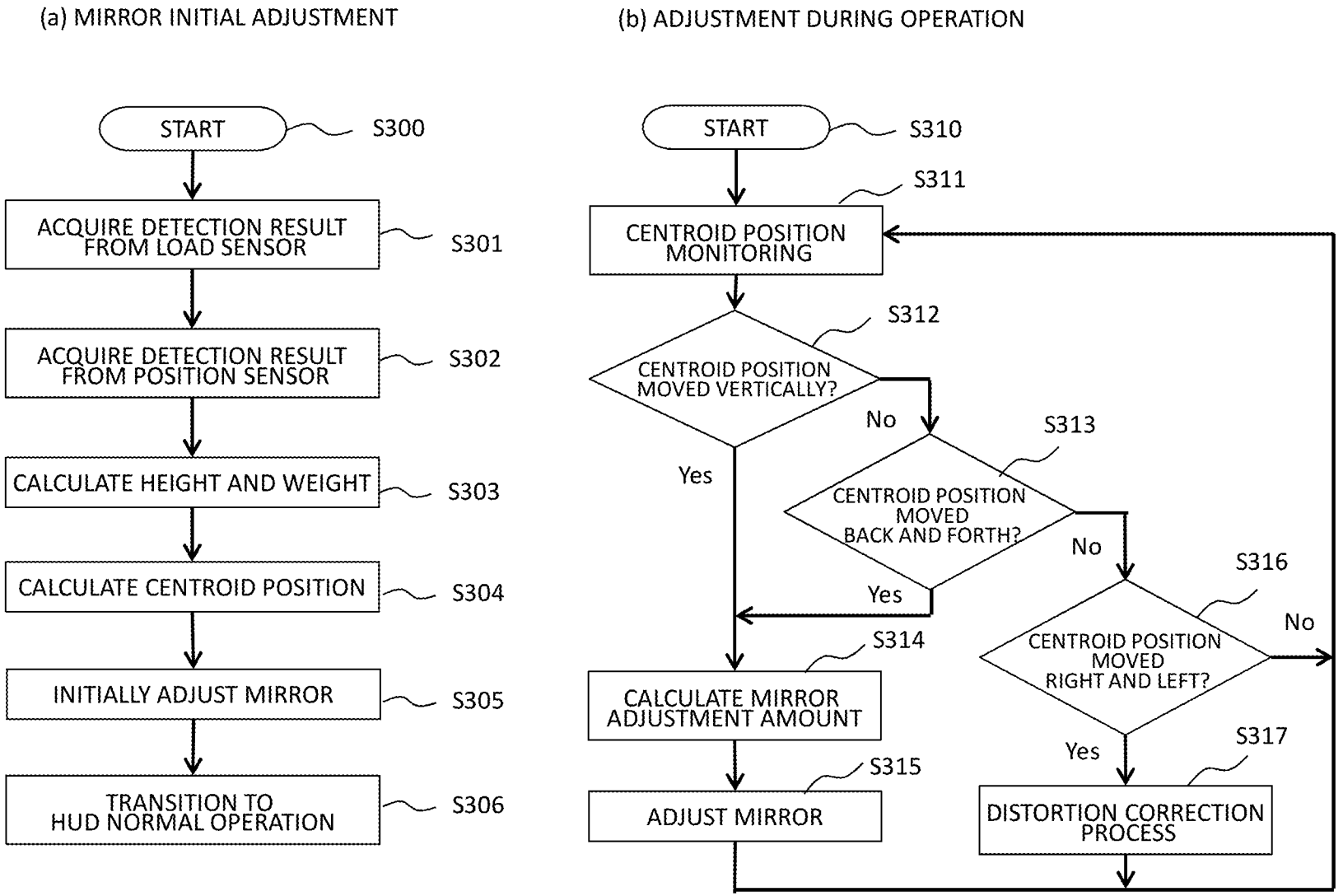
FIG. 19 are flowcharts showing the operation of the automatic mirror adjustment.

FIG. 19 are flowcharts showing the operation of automatic mirror adjustment, in which (a) shows initial adjustment and (b) shows adjustment during driving.

In the initial adjustment (S300) of (a), the detection results are acquired from the load sensor 119 through the vehicle information acquisition unit 5 (S301), and the detection results are acquired from the position sensor 120 (S302). The centroid calculation unit 19 in the control unit 10 calculates the height and weight of the driver according to those detection results (S303) and calculates the centroid position 65 and the eye point 8 position (S304). The calculated value is stored as an initial value. The mirror adjustment unit 18 calculates the mirror adjustment amount according to the calculated position of the eye point, and optimally adjusts the position and angle of the mirror 3 through the mirror drive unit 4 (S305). Thereafter, the operation shifts to the HUD normal operation (S306).

In the adjustment (S310) during the operation in (b) (S310), the centroid calculation unit 19 monitors the centroid position of the driver and monitors a change from the initial value of the centroid position (S311). When the centroid position moves in the vertical direction (Yes in S312), or when the centroid position moves in the anteroposterior direction (Yes in S313), the mirror adjustment amount corresponding to the movement amount is calculated by the mirror adjustment unit 18 (S314), and the position and angle of the mirror 3 are adjusted through the mirror drive unit 4 (S315). In addition, when the centroid position has moved in the right and left direction (Yes in S316), the distortion correction unit 16 corrects the distortion of the image (S317). Thereafter, the process returns to the centroid position monitoring (S311), and repeats the above flow.

According to the flow described above, even when the driver changes to another driver or when the driver's posture during driving changes, the display image follows the driver's change or the change in the posture without deviating from the visual line of the driver, which is excellent in the usability for the driver.

Although there is a method of using a camera to detect the position of the driver's eyes, there are the following drawbacks. In the case of the camera system, the position of the visual line of the driver is detected by image recognition, but detection accuracy depends on surrounding environment, weather, or the like. In particular, under dark conditions during night driving, the detection precision extremely decreases due to the decrease in the amount of light and contrast in the vehicle, and the follow-up performance is poor. In general, the movement of the visual line is frequently performed during driving, however, if the mirror adjustment is carried out one by one following the frequent movement of the visual line, there is a fear that the driver may have an adverse effect such as eye fatigue and sickness.

On the other hand, in the present example, the centroid position of the driver is calculated with the use of a load sensor, a position sensor, or the like, and follow-up control according to the centroid movement is performed. Therefore, since the detection value is stable and the display video is also stable, there is no uncomfortable feeling given to the driver.

In the above examples 1 and 2, the configuration has been described in which the image display area is mainly moved in the vertical direction according to the position (eye point) of the driver's eyes. In the following examples 3 to 5, a configuration for moving the display area in the right and left direction will be described.

EXAMPLE 3

In an example 3, in order to move the display area of the image in the right and left direction, a configuration for moving the entire HUD in the dashboard in the right and left direction will be described. The reasons why there is a need to move the display area in the right and left direction will be described below, for example.

(1) A case in which the position (eye point) of the driver's eyes moves in the right and left direction.
(2) A case in which the posture (centroid position) of the driver moves in the right and left direction.
(3) A case in which a vehicle traveling direction changes according to driving operation (steering wheel operation or direction indicator).
(4) A case in which the driver's visual line direction changes according to road guidance (right/left turn sign and intersection distance).
(5) A case in which the driver's visual line direction changes due to an obstacle (an interruption car or a rush-out pedestrian).

The change in those situations is acquired as vehicle information by information acquisition devices (various types of sensors and so on) mounted on the vehicle, and the control unit of the HUD automatically displays the image at an optimum position. First of all, an entire configuration will be described.

Figure 20:
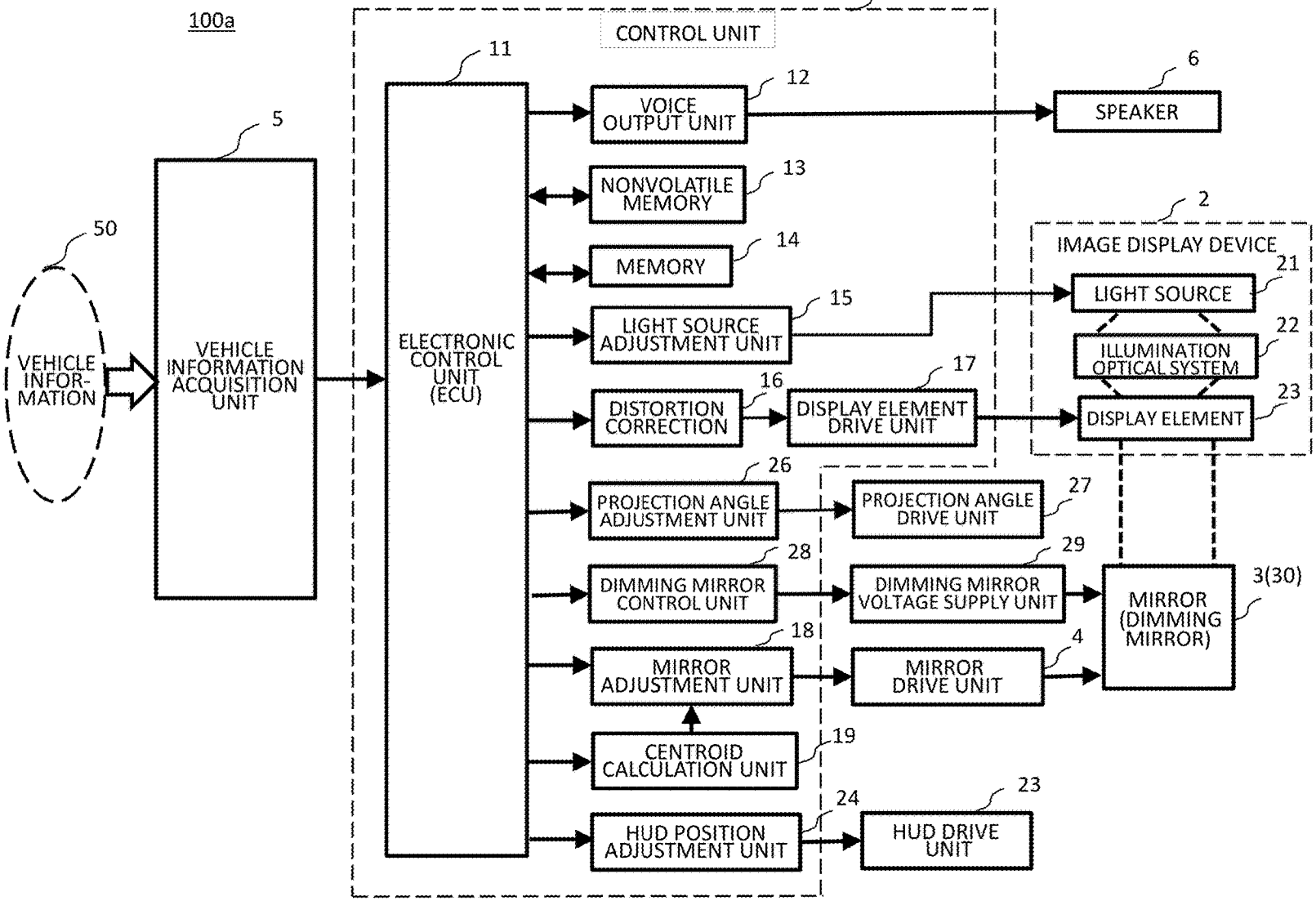
FIG. 20 is a block diagram showing an internal configuration of a head up display according to an example 3.

FIG. 20 is a block diagram showing an internal configuration of a head up display 100a. The internal configuration additionally has a function of moving the entire HUD 100a to the right and left in relation to the present example. Meanwhile, FIG. 20 shows a case in which the image display device 2 is installed on a roof of the vehicle and projects an image, and a case in which a dimming mirror 30 capable of switching between reflection and non-reflection is used as the mirror 3 in relation to examples 4 and 5 which will be described later.

The functions added to the configuration in FIG. 2 are as follows. The HUD position adjustment unit 24 determines a movement position of the HUD 100a and transmits a control signal to the HUD drive unit 25. The HUD drive unit 25 includes a rail guide and a drive motor as will be described later, and moves the HUD 100a to the right and left. The projection angle adjustment unit 26 determines a projection direction (projection angle) when the image display device 2 is installed on the roof of the vehicle, and the projection angle drive unit 27 changes a direction of the projection unit of the image display device 2. When the dimming mirror 30 is used, the dimming mirror control unit 28 generates a reflection/non-reflection switching signal of the dimming mirror 30, and the dimming mirror voltage supply unit 29 applies a predetermined voltage to the dimming mirror 30 to switch between a mirror state (ON state) and a transparent state (OFF state).

Figure 21:
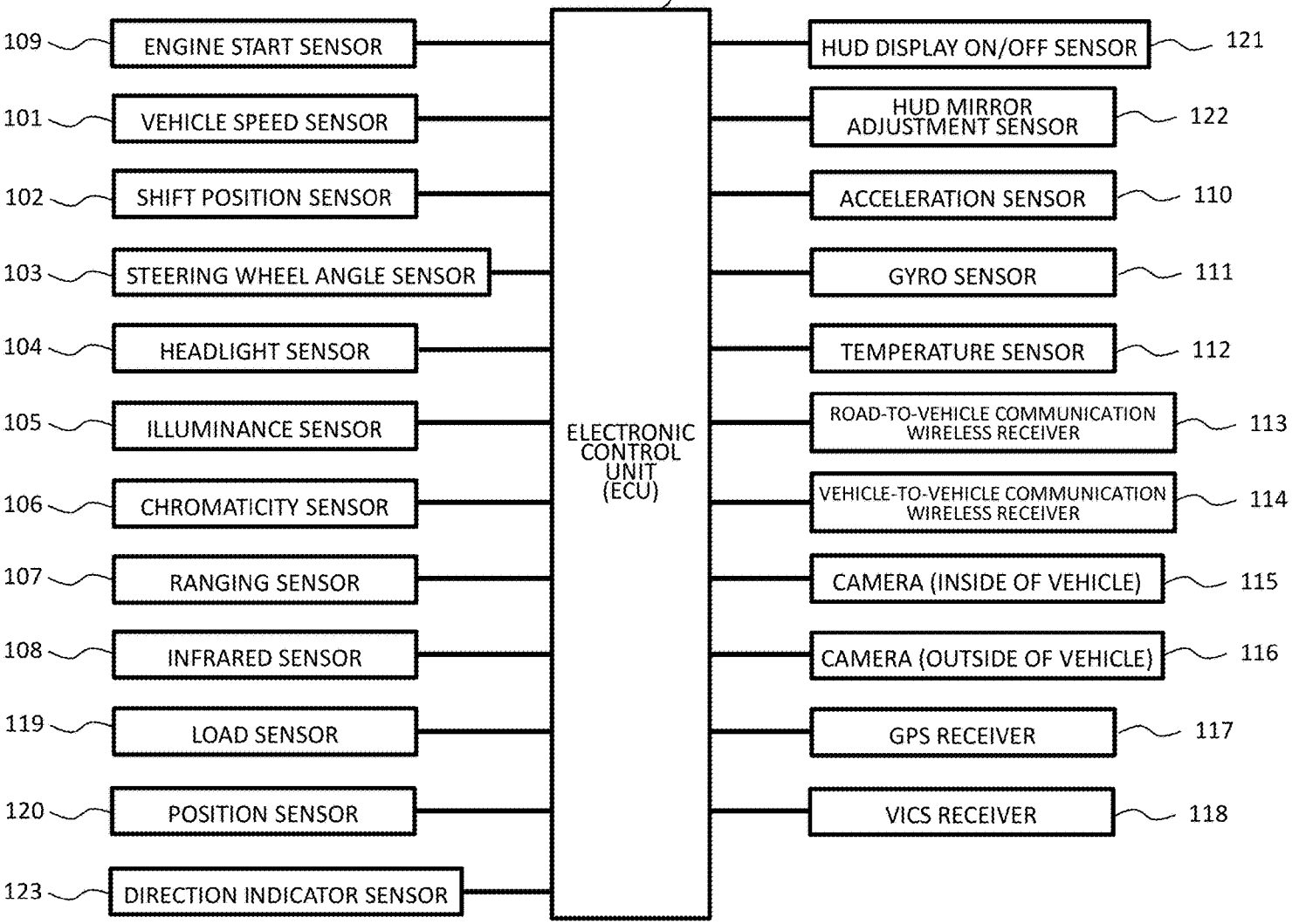
FIG. 21 is a block diagram showing an example of a hardware configuration relating to acquisition of vehicle information.

FIG. 21 is a block diagram showing an example of a hardware configuration relating to acquisition of the vehicle information 50. A direction indicator sensor 123 is added to the configuration of FIG. 3. In the present example, in order to automatically move the display area in the right and left direction, for example the following sensors are used.

(1) Position of the driver's eyes . . . camera (side the vehicle) 115
(2) Posture of the driver . . . load sensor 119, position sensor 120
(3) Driving operation . . . steering wheel angle sensor 103, direction indicator sensor 123
(4) Road guide . . . GPS receiver 117, VICS receiver 118
(5) Obstacle . . . camera (outside the vehicle) 116

Signals from those sensors are transmitted to the HUD position adjustment unit 24 through the electronic control unit (ECU) 11, and the HUD drive unit 25 moves the position of the HUD to an optimum position and displays the image.

Figure 22:
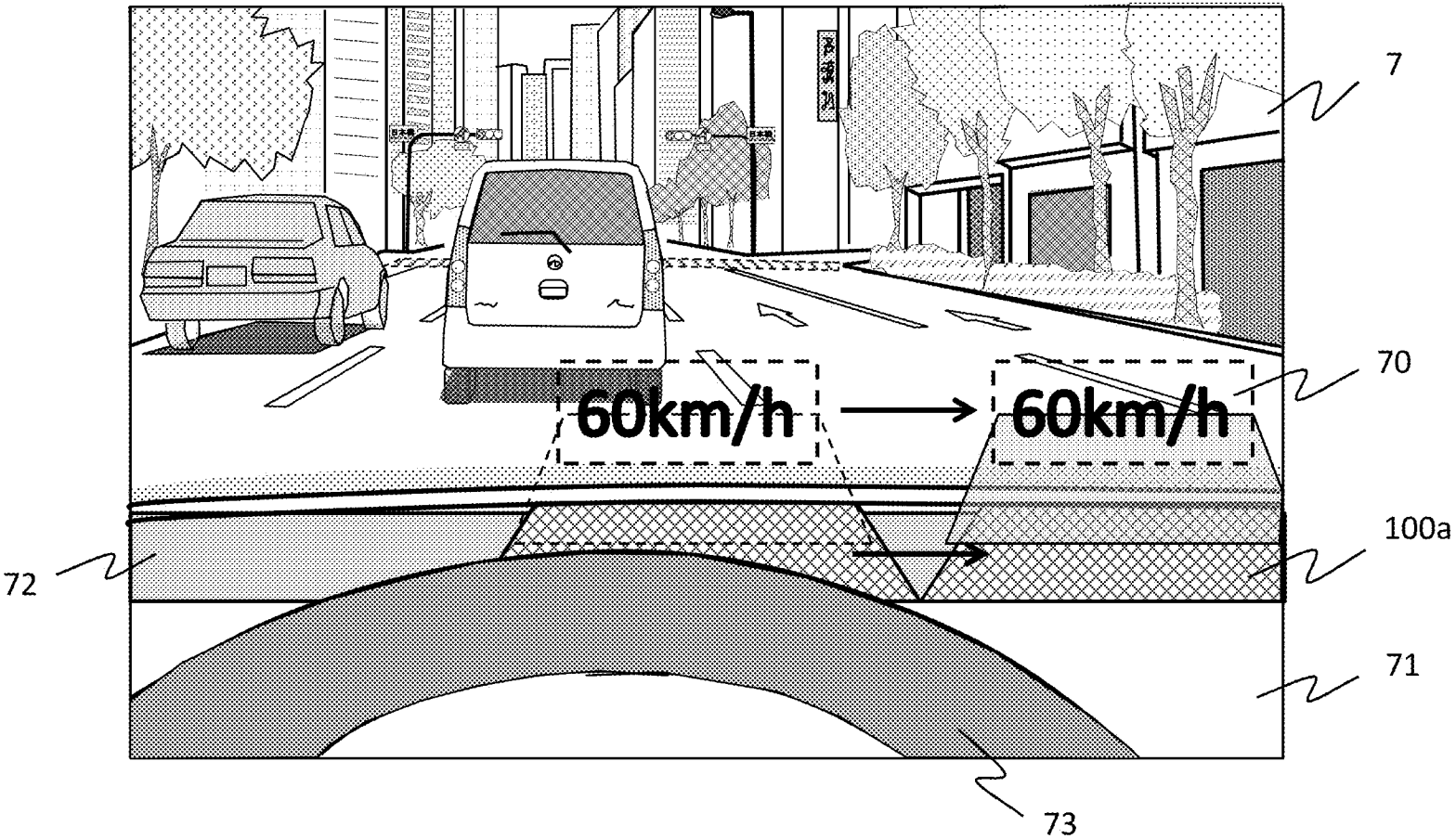
FIG. 22 is a diagram showing an example of an image display state as viewed from a driver's seat.

FIG. 22 is a diagram showing an example of the image display state as viewed from the driver's seat. An image (in this example, a vehicle speed value "60 km/h") is displayed so as to be superimposed on scenery ahead through the windshield 7. The display position (that is, the reflection position 70 on the windshield 7) is moved in the right and left direction, for example, in conjunction with the operation of a steering wheel 73. For that purpose, the HUD 100a housed in a lower portion of a dashboard 71 is configured to be movable to the right and left along a driving groove 72.

Figure 23:
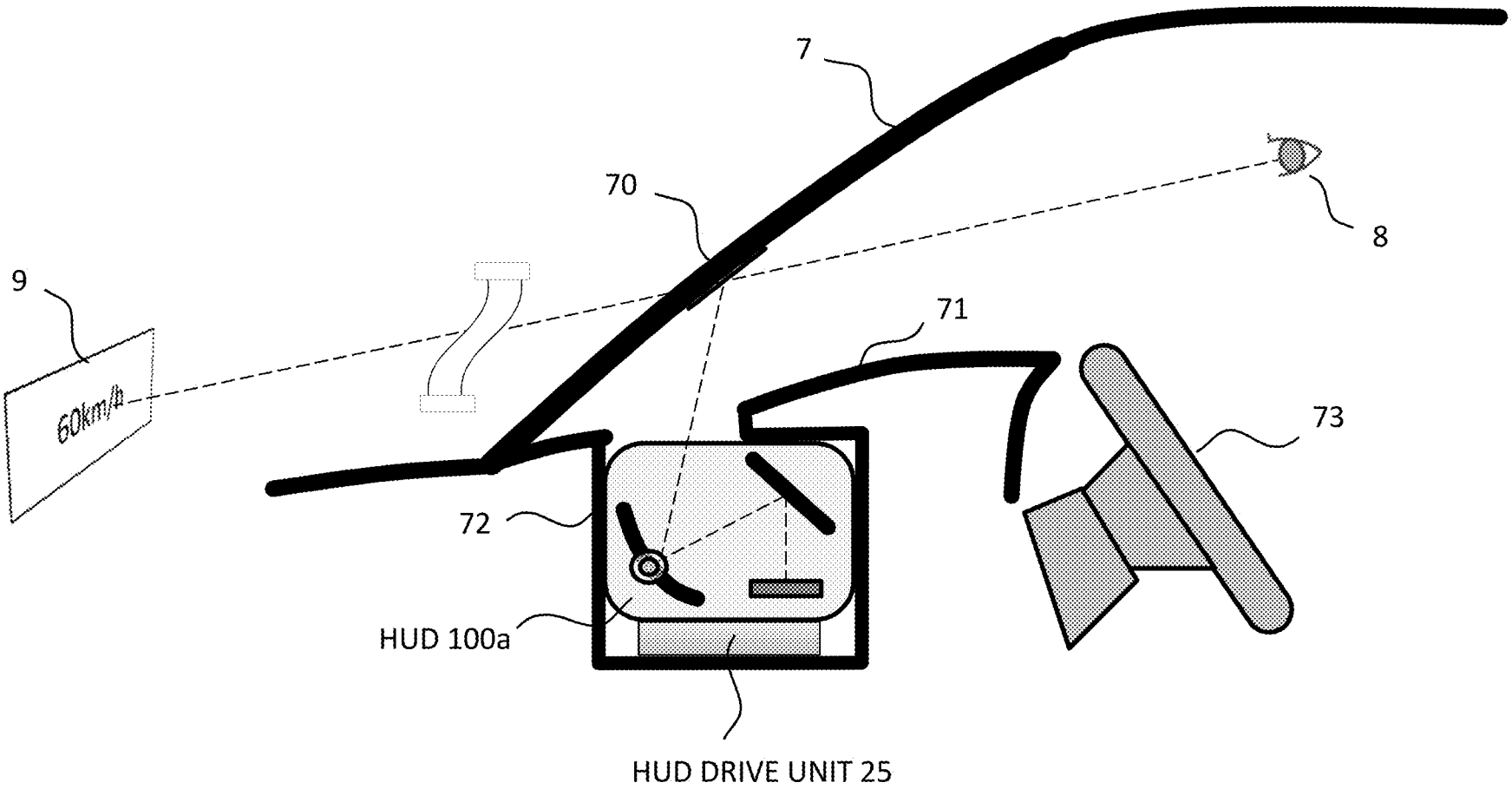
FIG. 23 is a cross-sectional view showing a video display operation in a vehicle.

FIG. 23 is a cross-sectional view of the inside of the vehicle showing the image display operation. A groove 72 is provided in the dashboard 71 to accommodate the HUD 100a. The HUD 100a is movable by the HUD drive unit 25 along the groove 72 in a depth direction of the drawing. The image light projected from the HUD 100a is reflected by the windshield 7 (reflection position 70) and is incident on the driver's eyes 8, so that the driver views the virtual image 9 ahead of the reflection position 70.

Figure 24:
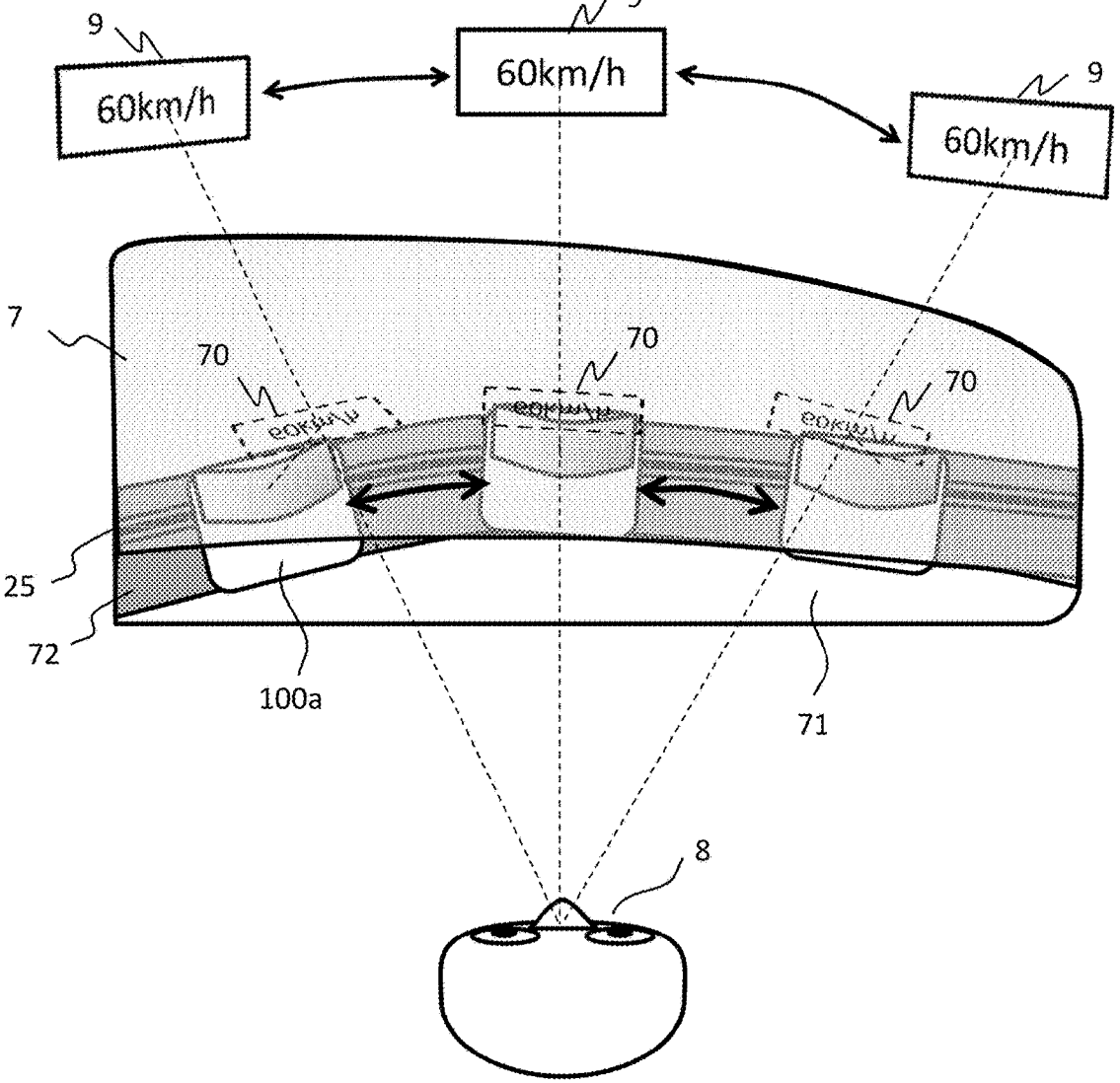
FIG. 24 is a top view of an inside of the vehicle showing the image display operation.

FIG. 24 is a top view of the inside of the vehicle showing the image display operation. The position of the HUD 100a is moved in the right and left direction by the HUD drive unit 25 (in this case, a drive belt is used) to move the reflection position 70 of the image as viewed from the driver's eyes 8, that is, the position of the virtual image 9 ahead, thereby being capable of moving the display position of the image in the right and left direction as shown in FIG. 22.

Figure 25A:
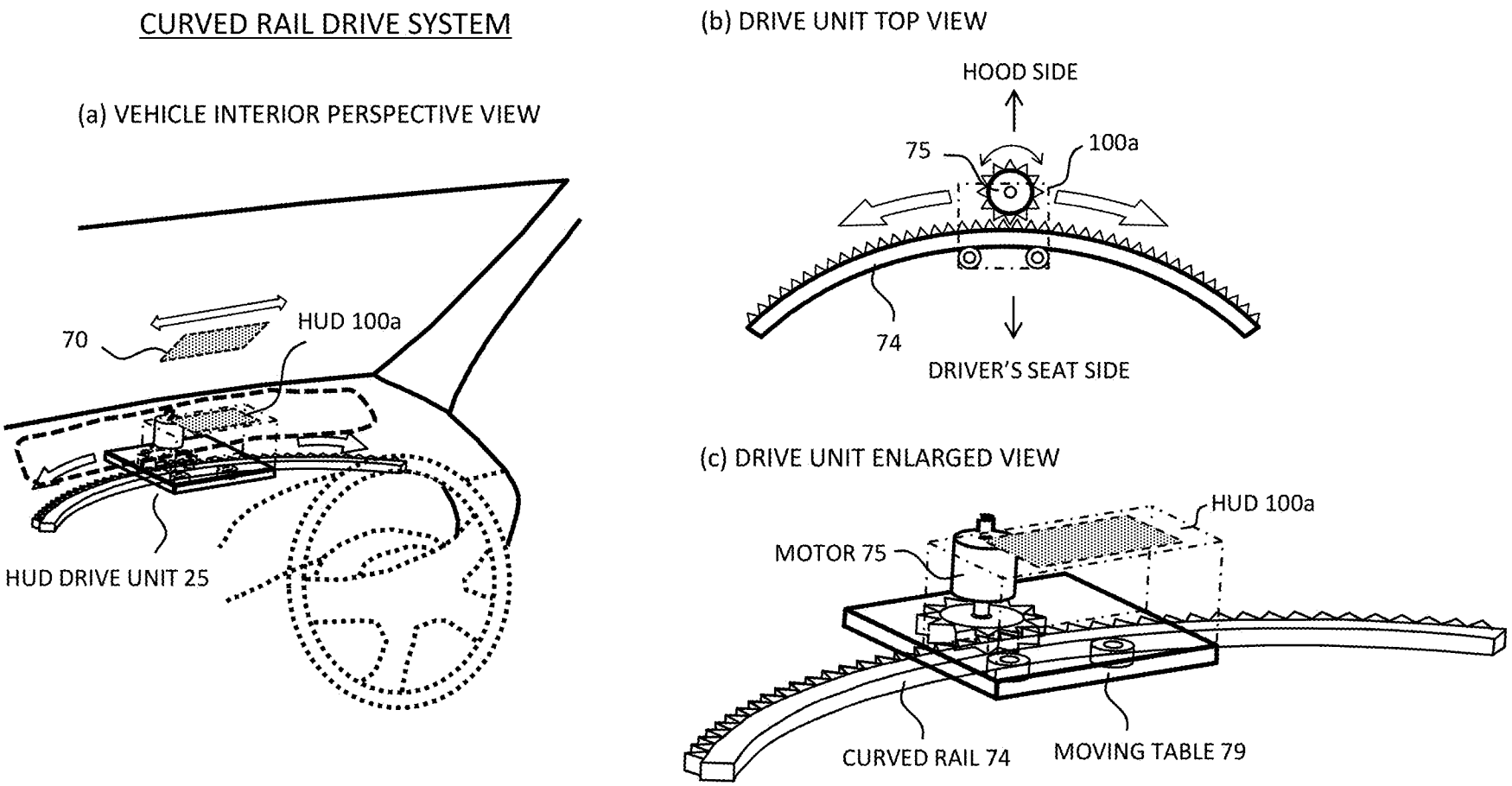
FIG. 25A are diagrams showing a specific drive mechanism of an HUD drive unit.
Figure 25B:
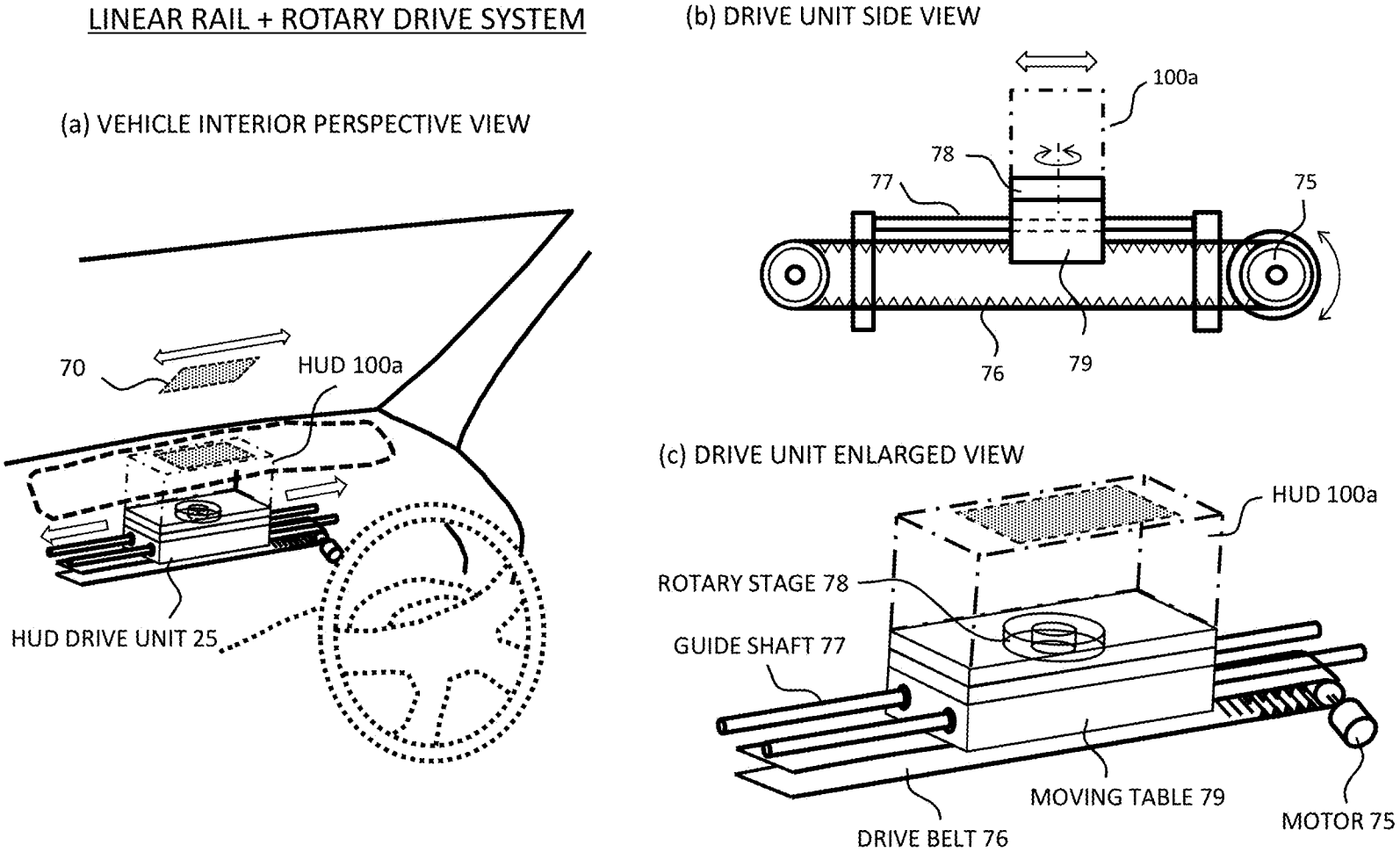
FIG. 25B are diagrams showing a specific drive mechanism of the HUD drive unit.

FIGS. 25A and 25B are diagrams showing two systems of a specific drive mechanism of the HUD drive unit 25.

FIG. 25A show a curved rail drive system in which (a) is a perspective view of the inside of the vehicle, (b) is a top view of the drive unit, and (c) is an enlarged view of the drive unit. The HUD 100a is fixedly mounted on a moving table 79 and the moving table 79 moves in the right and left direction along the curved rail 74 by a driving force of the motor 75 attached to the table. The driving force of the motor 75 is transmitted to a driving roller (driving gear) which is directly connected to the motor 75, and the driving roller is meshed with a gear of the curved rail 74 to cause the moving table 79 to travel. In that case, with the use of the curved rail 74, a projection direction (an angle in the right and left direction) of the HUD 100a is changed according to a curvature at the same time, and the image can be displayed at an optimum projection angle as viewed from the driver's seat according to the right and left moving position. The type of the motor 75 is not particularly limited, but a stepping motor or a servo motor is suitable.

FIG. 25B show a case of a linear rail+a rotation drive system, in which (a) is a perspective view of the inside of the vehicle, (b) is a side view of the drive unit, and (c) is an enlarged view of the drive unit. The HUD 100a is attached onto the moving table 79 through a rotary stage 78, and the moving table 79 is moved in the right and left direction along the linear guide shaft 77 by the motor 75 and the drive belt 76. The moving table 79 is fixed at a predetermined position on the drive belt 76, and the drive belt 76 reciprocates between a driving roller (or a pulley) that transmits the driving force of the motor 75 and a driven roller (or a pulley) that is installed on the opposite side. The rotary stage 78 is configured to change the projection direction of the HUD 100a, thereby being capable of displaying the image with an optimum projection angle according to the right and left moving position of the HUD 100a. Similarly, in this case, the motor 75 is not particularly limited, but a stepping motor or a servomotor is suitable.

Figure 26:
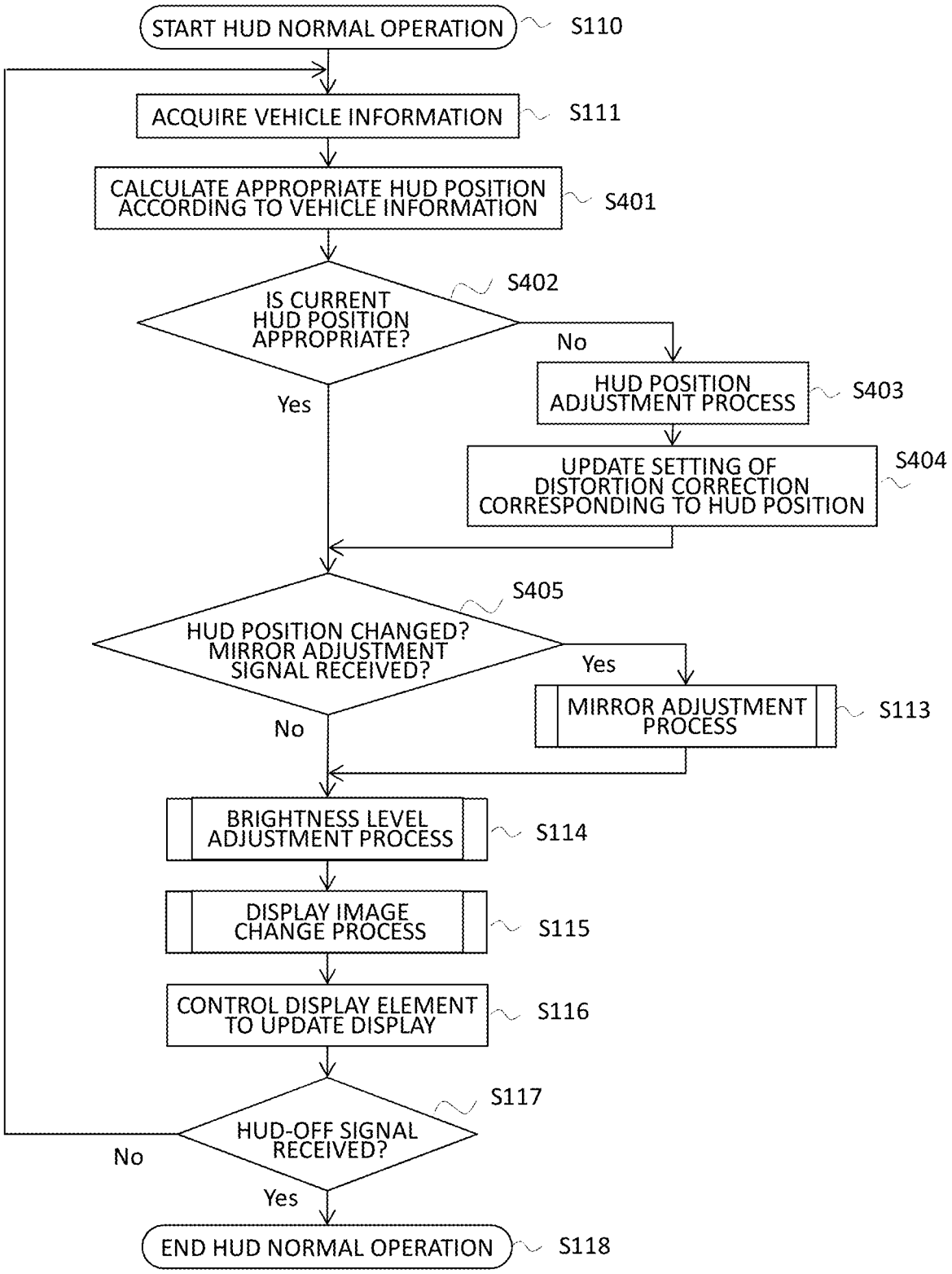
FIG. 26 is a flowchart showing a display area moving operation by HUD position adjustment.

FIG. 26 is a flowchart showing a display area moving operation by the HUD position adjustment. A process for adjusting the HUD position is added based on the HUD normal operation shown in FIG. 5(b). Hereinafter, an example in which the display area is moved in conjunction with the steering wheel operation will be described.

When steering angle information from the steering wheel angle sensor 103 is acquired as the vehicle information 50 in S111, the HUD position adjustment unit 24 calculates an appropriate HUD position according to the steering angle information in S401. For that reason, an appropriate display position (that is, the HUD position) for the direction and size of the steering angle is determined in advance. For example, the amount of movement of the display position in the right and left direction is set to be substantially proportional to the size of the steering angle.

In S402, the HUD position adjustment unit 24 determines whether the current HUD position is appropriate or not. The process proceeds to S405 if the current position is appropriate, and proceeds to S403 if the position is appropriate, and performs the HUD position adjustment process.

In the HUD position adjustment in S403, the HUD is moved to an appropriate position by the HUD drive unit 25 (the motor 75, the drive belt 76, and so on), and the projection direction is also adjusted according to the HUD position. In S404, setting of the distortion correction corresponding to the moved HUD position is updated. Since the display position moves to the right and left to cause distortion to occur in the image as viewed from the driver, the setting of the image correction process by the distortion correction unit 16 is changed.

It is determined whether the HUD position has been changed or the mirror adjustment signal has been received or not, in S405. If yes, the mirror adjustment process is performed in S113. Because a relationship between the image projection angle to the windshield 7 and the curvature of the reflective surface changes with the movement of the HUD position, a depression angle of the display image as viewed from the driver may change. In order to keep the depression angle constant, a vertical angle of the mirror is adjusted. An inclination of the HUD drive mechanism in the anteroposterior direction may be provided so that the change in the depression angle of the display image caused by the HUD movement may be absorbed by the inclination.

Since S114 and subsequent steps are the same as those in FIG. 5(b), a description of those steps will be omitted.

In this example, it has been described that the display area of the image is moved in the right and left direction by taking the change in the steering wheel angle as an example. It is needless to say that the same can be applied to a change in the above conditions (1) to (5).

According to the present example, since the display area of the image moves to the right and left according to the position of the driver's eyes and the driving situation, there is advantageous in that the image can be suitably displayed according to the change in the visual line of the driver.

EXAMPLE 4

Similarly, in an example 4, the image display area is moved in the right and left direction. However, an image display device with a variable projection direction is installed on a roof in the vehicle and a mirror installed on the dashboard is moved to the right and left.

Figure 27:
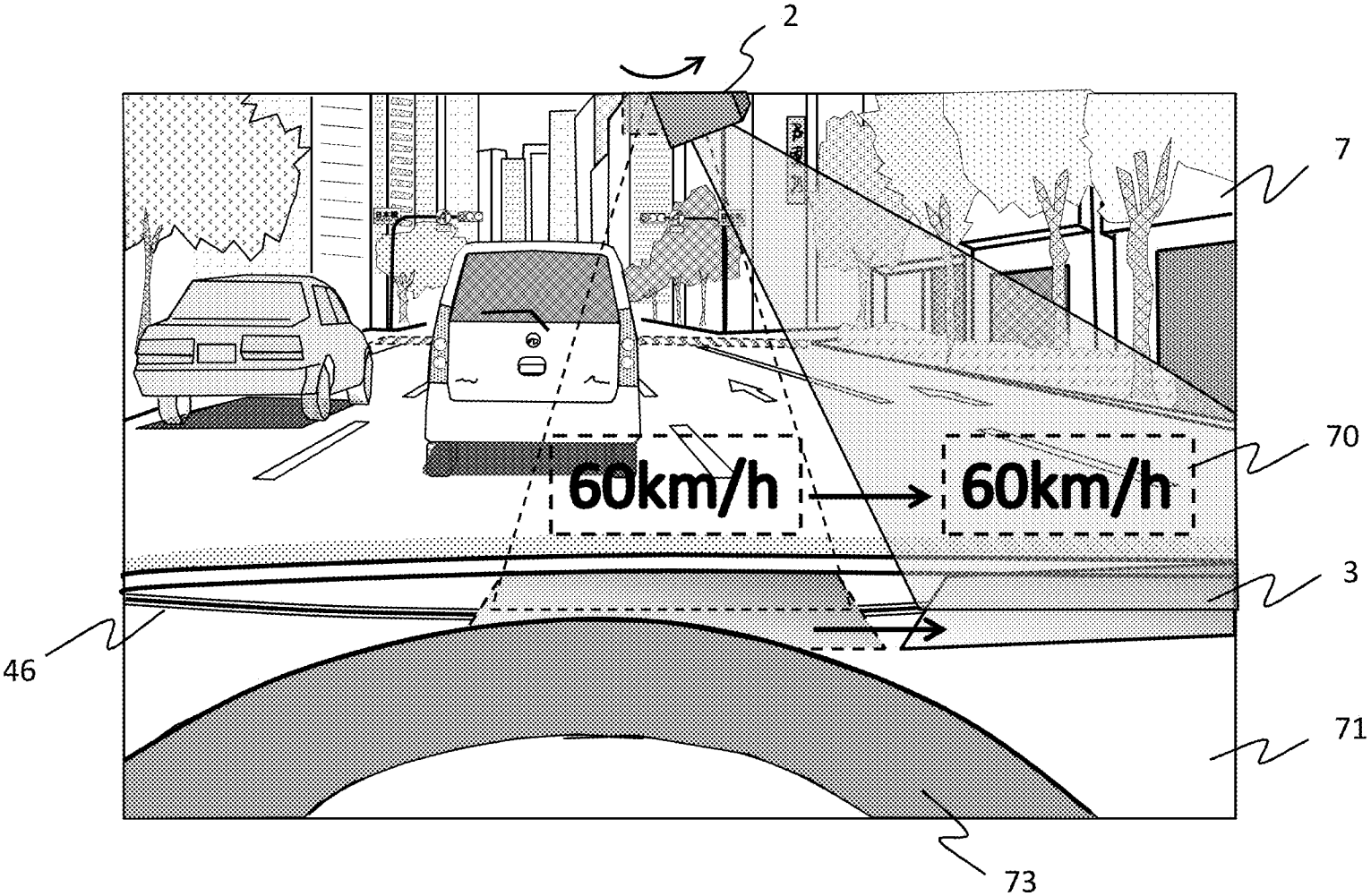
FIG. 27 is a diagram showing an example of an image display state as viewed from a driver's seat according to an example 4.

FIG. 27 is a diagram showing an example of the image display state as seen from the driver's seat. The image display device 2 is installed on the roof and the projection direction is variable in the right and left direction. On the other hand, on the dashboard 71, the mirror 3 which receives an image projection light from the image display device 2 is moved by the mirror drive belt 46. The movement position of the mirror 3 is linked with the projection direction of the image display device 2. With the above configuration, the reflection position 70 of the image can be moved in the left and right direction.

Figure 28:
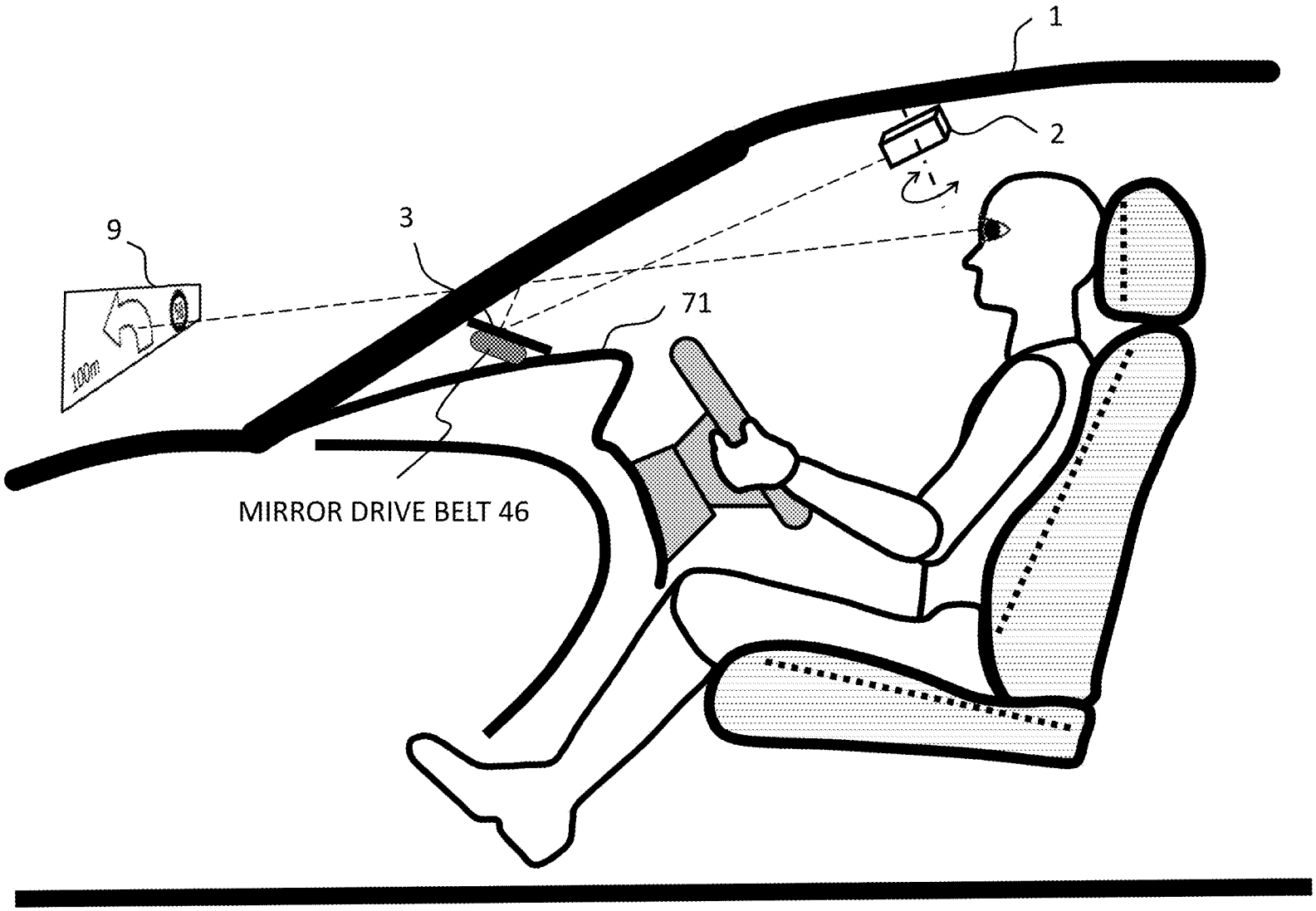
FIG. 28 is a cross-sectional view of the inside of the vehicle showing the image display operation.

FIG. 28 is a cross-sectional view showing the inside of the vehicle showing the image display operation. The image display device 2 is installed on the roof and the projection direction is changed by the projection angle drive unit 27. The mirror 3 on the dashboard 71 is configured to move in a depth direction of the drawing by the mirror drive belt 46 which is a mechanism of the mirror drive unit 4. This makes it possible to move the display position of the virtual image 9 in the right and left direction.

Figure 29:
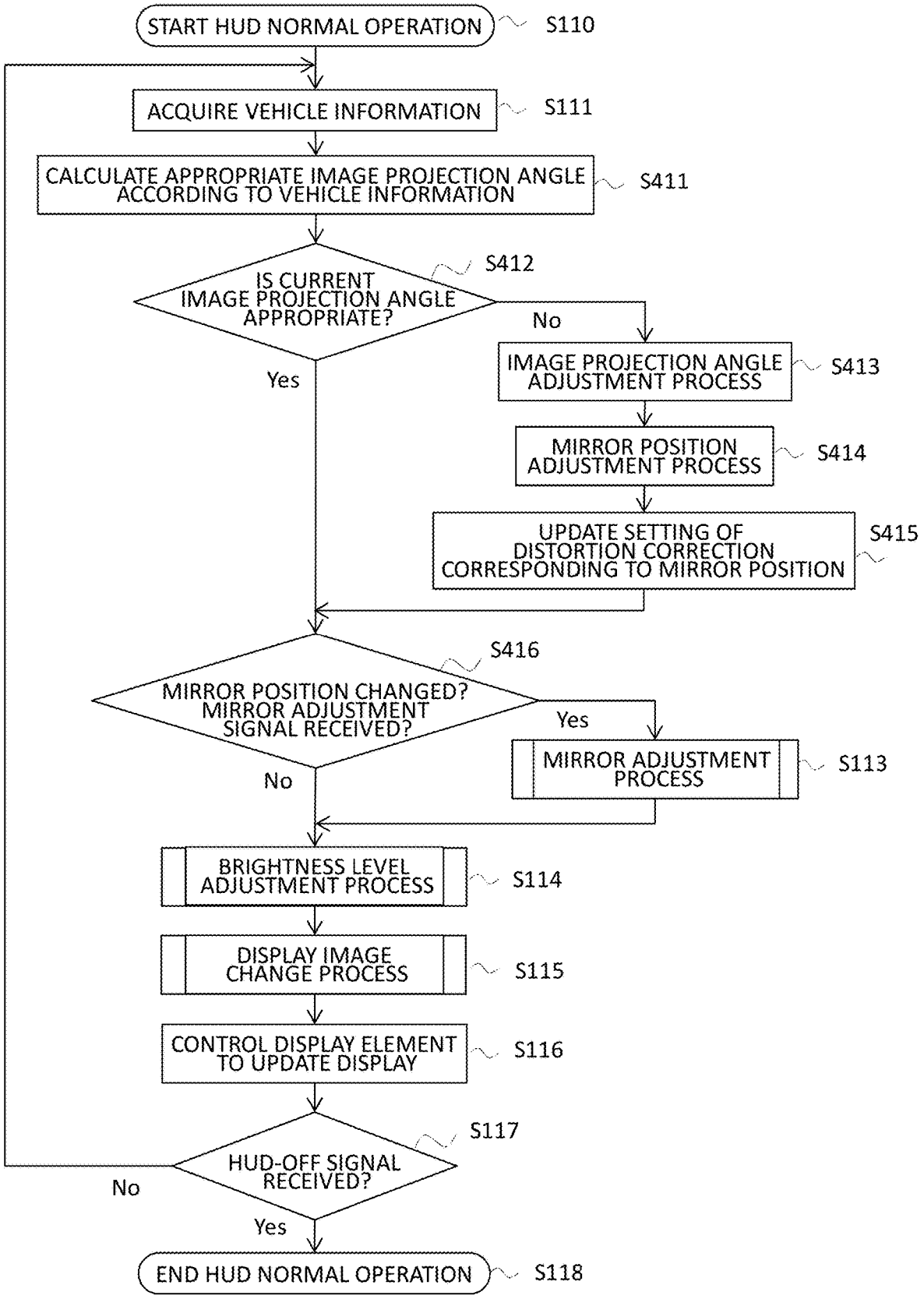
FIG. 29 is a flowchart showing a display area moving operation by adjusting a projection angle and a mirror position.

FIG. 29 is a flowchart showing the display area moving operation by adjustment of the projection angle and the mirror position. Steps for adjusting the projection angle and the mirror position are added to the HUD normal operation in FIG. 5(b). Similarly, a case in which the display area is moved in conjunction with the steering wheel operation will be exemplified.

In S111, when the steering angle information from the steering wheel angle sensor 103 is acquired as the vehicle information 50, the projection angle adjustment unit 26 calculates an appropriate image projection angle of the image display device 2 according to the steering angle information in S411. For that reason, the appropriate image projection angle for the direction and size of the steering angle is determined in advance.

In S412, the projection angle adjustment unit 26 determines whether the current image projection angle is appropriate or not. If the current image projection angle is appropriate, the process proceeds to S416, and if the current image projection angle is different from the appropriate projection angle, the process proceeds to S413, and performs a projection angle and mirror position adjustment process.

In the image projection angle adjustment process of S413, the image display device 2 installed on the roof is rotated by the projection angle drive unit 27 so as to adjust the image projection direction to an appropriate projection angle. In S414, the mirror 3 is moved to a position corresponding to the projection direction by the mirror drive unit 4 (mirror drive belt 46) with a change in the projection angle. In S415, the distortion correction setting corresponding to the moved mirror position is updated. Since the display position is moved to the right and left, and distortion occurs in the image viewed from the driver, the setting of the image correction process by the distortion correction unit 16 is changed.

In S416, it is determined whether or not the mirror position has been changed or the mirror adjustment signal has been received. If yes, the mirror adjustment process (angle adjustment) is performed in S113. Because a relationship between the image projection angle to the windshield 7 and the curvature of the reflective surface changes with the movement of the mirror position, a depression angle of the display image as viewed from the driver may change. In order to keep the depression angle constant, a vertical angle of the mirror is adjusted. An inclination of the mirror drive mechanism in the anteroposterior direction may be provided so that the change in the depression angle of the display image caused by the mirror movement may be absorbed by the inclination.

Since S114 and subsequent steps are the same as those in FIG. 5(b), a description of those steps will be omitted.

In that flowchart, the projection angle adjustment unit 26 first determines the image projection angle of the image display device 2 according to a steering angle, and the mirror drive unit 4 moves the mirror 3 according to the determined image projection angle. Conversely, the moving position of the mirror 3 may be first determined by the mirror adjustment unit 4 according to the steering angle and the projection angle drive unit 27 may change the image projection angle according to the determined moving position.

Similarly, in this example, it has been described that the display area of the image is moved in the right and left direction by taking the change in the steering wheel angle as an example. It is needless to say that the same can be applied to a change in the above conditions (1) to (5).

According to the present example, since the moving mechanism of only the mirror is used instead of the moving mechanism of the entire HUD, the configuration is simplified and the moving speed of the display position is improved.

EXAMPLE 5

Likewise, in an example 5, the image display area is moved in the right and direction. In addition, an image display device with a wide viewing angle is installed on a roof in the vehicle, multiple dimming mirrors are disposed on the dashboard in the right and left direction, and the respective dimming mirrors are switched between a reflection state and a non-reflection state.

Figure 30:
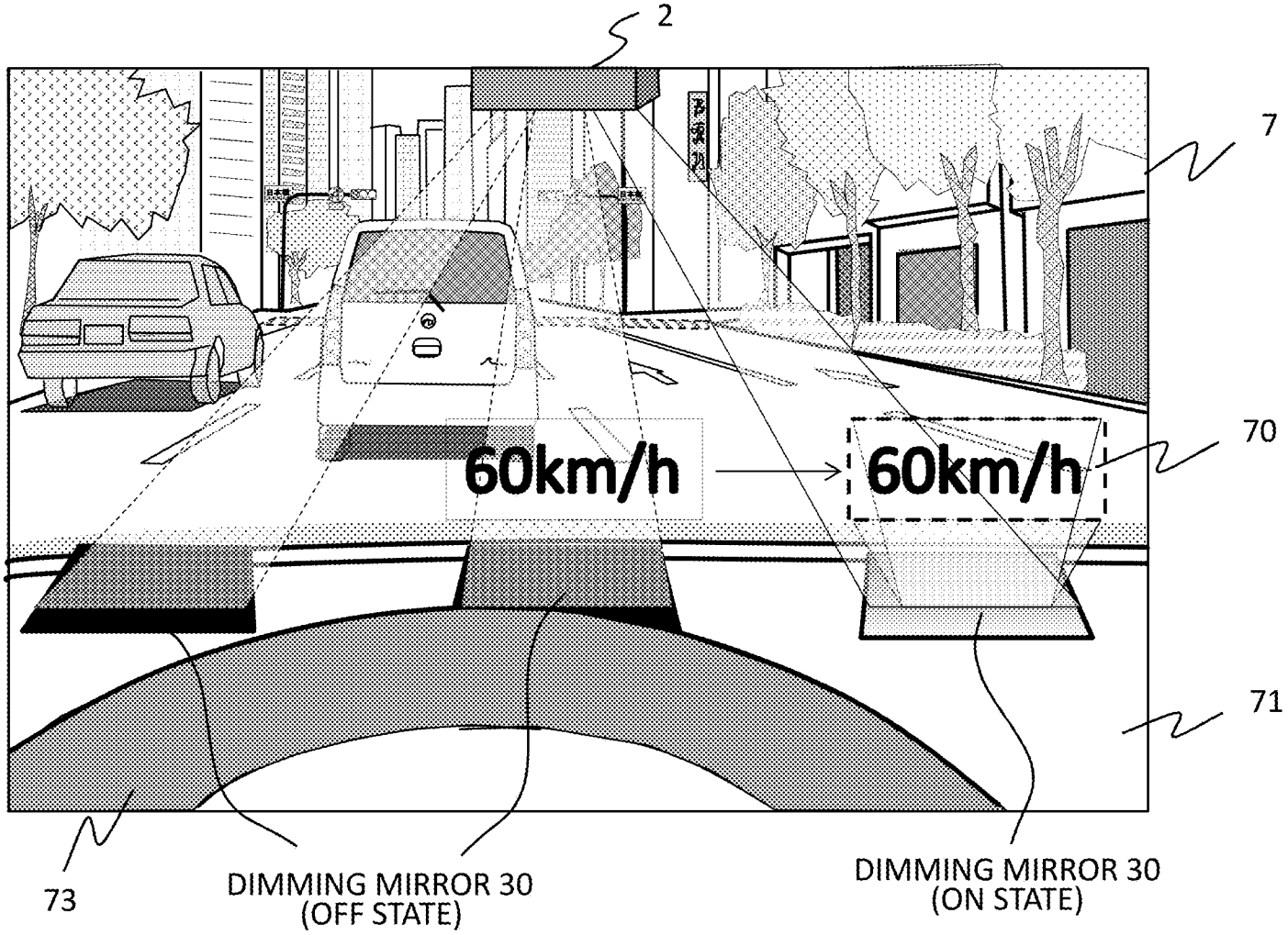
FIG. 30 is a diagram showing an example of an image display state as viewed from a driver's seat according to an example 5.

FIG. 30 is a diagram showing an example of the image display state as seen from the driver's seat. The image display device 2 with the wide viewing angle is installed on the roof, and the multiple dimming mirrors 30 are disposed on the dashboard 71 in the right and left direction. Since the image display device 2 has a display characteristic of a wide viewing angle, the image light can be simultaneously irradiated to the respective dimming mirrors 30. In this example, each of the dimming mirrors 30 is a device capable of switching between a reflective state (=mirror surface state) and a non-reflective state (=transparent state) upon receiving a predetermined voltage. In other words, the image is displayed at the position of the dimming mirror 30 which is in the reflective state (ON state), but the image is not displayed at the position of the dimming mirror 30 which is in the non-reflective state (OFF state). With the selection of the dimming mirror 30 to be in the reflective state (ON state), the image reflection position 70 can be moved in the right and left direction.

Figure 31:
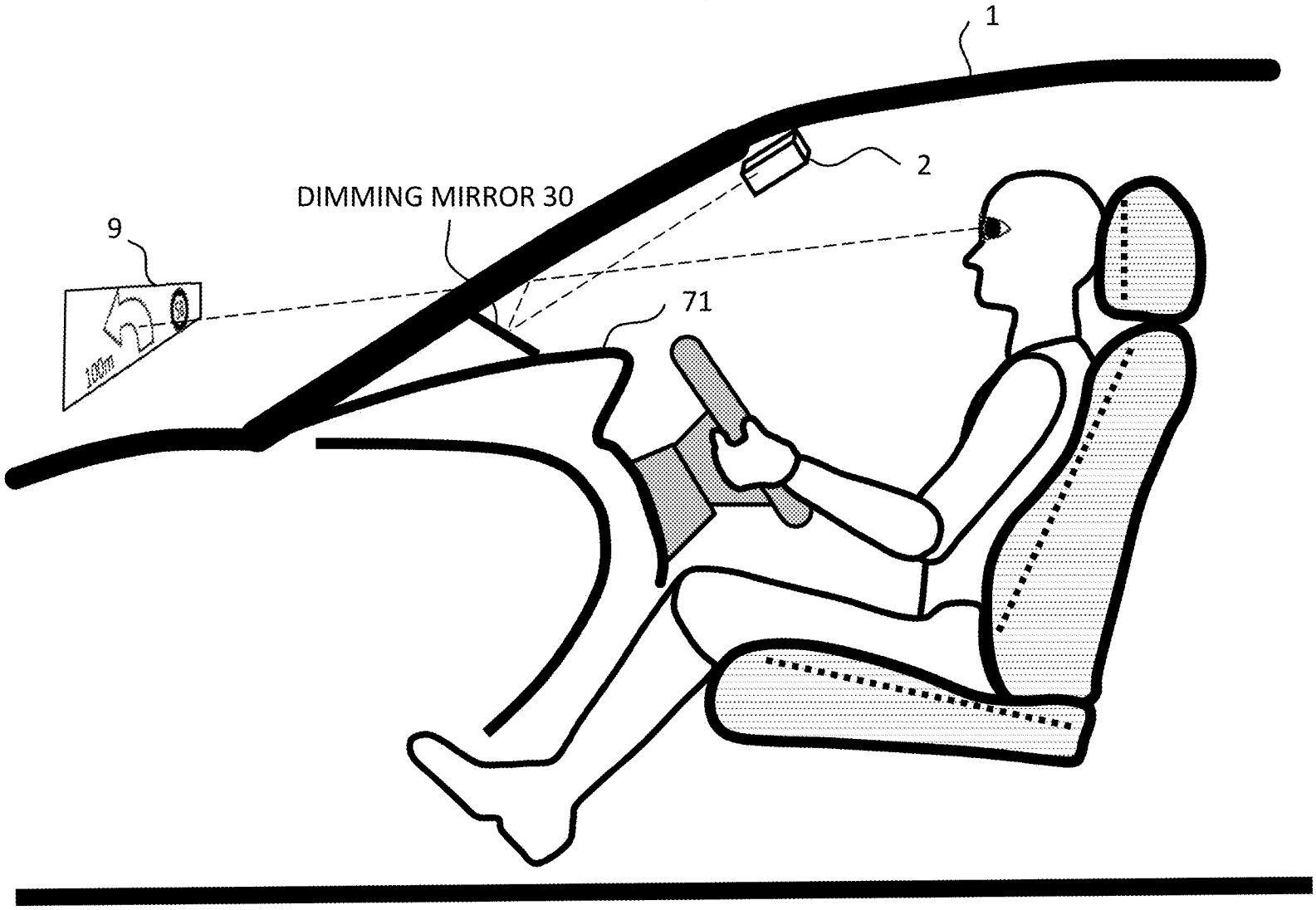
FIG. 31 is a cross-sectional view of the inside of the vehicle showing the image display operation.

FIG. 31 is a cross-sectional view of the inside of the vehicle showing the image display operation. The image display device 2 with a wide viewing angle is installed on the roof, multiple dimming mirrors 30 are disposed on the dashboard 71 in the depth direction of the drawing. The dimming mirror control unit 28 selects the dimming mirror 30 to be in the reflective state (ON state), and receives a predetermined voltage by the dimming mirror voltage supply unit 29, thereby being capable of moving the display position of the virtual image 9 in the right and left direction.

Figure 32:
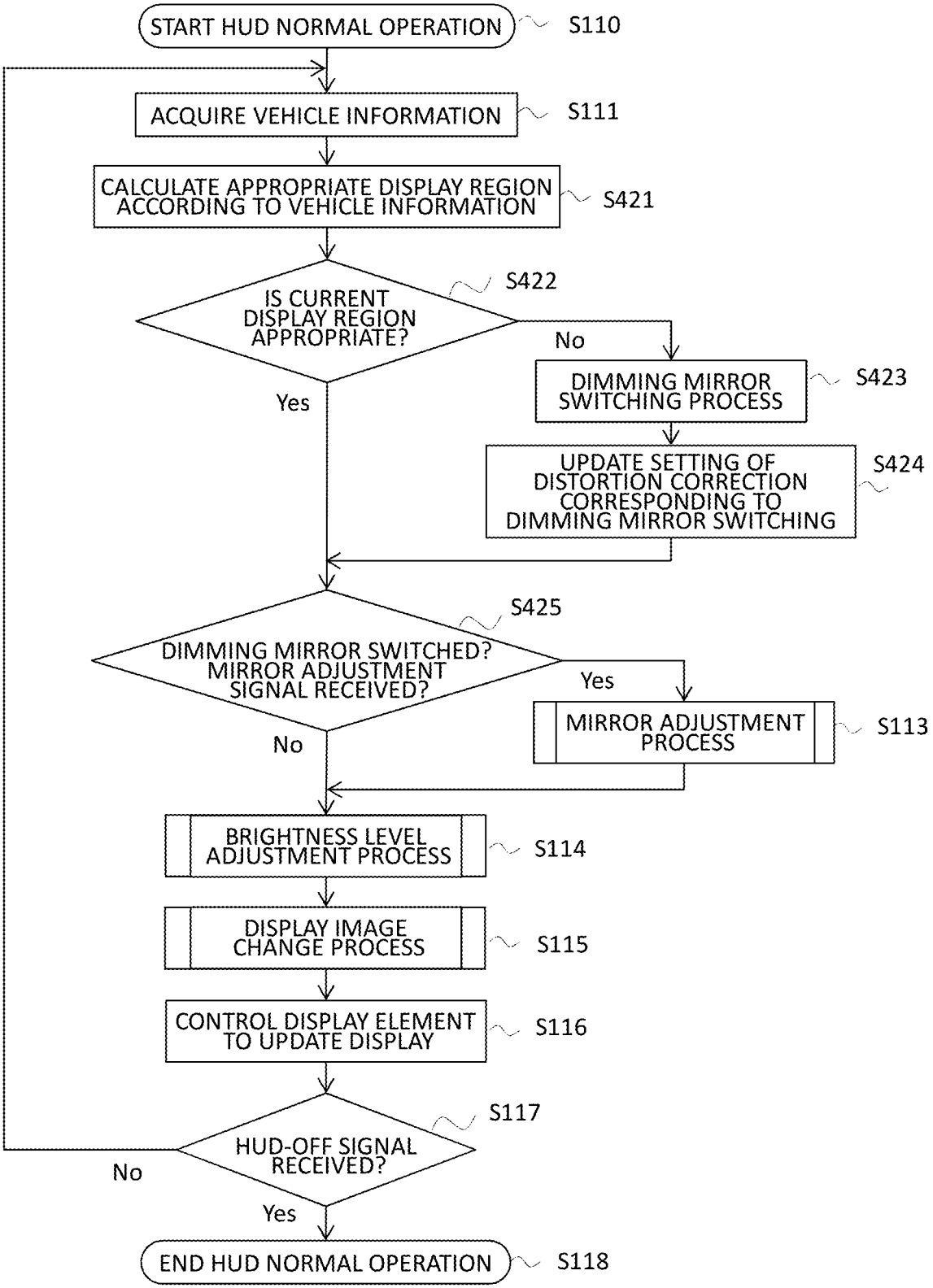
FIG. 32 is a flowchart showing a display area moving operation by switching a dimming mirror between a reflective state and a non-reflective state.

FIG. 32 is a flowchart showing the operation of moving the display area by switching the dimming mirror between the reflective state and the non-reflective state. A process for switching the dimming mirror to another is added to the HUD normal operation in FIG. 5(b). Similarly, in this example, a case in which the display area is moved in conjunction with the steering wheel operation will be exemplified.

In S111, upon acquiring the steering angle information from the steering wheel angle sensor 103 as the vehicle information 50, the dimming mirror control unit 28 calculates an appropriate image display area according to the steering angle information in S421. For that reason, an appropriate image display area for the direction and the size of the steering angle is determined in advance.

In S422, the dimming mirror control unit 28 determines whether or not the current image display area (the position of the dimming mirror which is in the ON state) is appropriate. If the display area is appropriate, the process proceeds to S425, and if the display area is different from the appropriate display area, the process proceeds to S423 to switch the dimming mirror 30 to another.

In the dimming mirror switching process of S423, a predetermined voltage is applied to the dimming mirror 30 corresponding to an appropriate display area by the dimming mirror voltage supply unit 29 to switch the dimming mirror 30 to the reflective state (ON state). The other mirrors 30 are switched to the non-reflective state (OFF state). In S424, the distortion correction setting corresponding to the dimming mirror switched to the ON state is updated. This is because the display position moves to the right and left, and distortion occurs in the image viewed from the driver, and therefore the setting of the image correction process by the distortion correction unit 16 is changed.

In S425, it is determined whether or not the dimming mirror has been switched to another or the mirror adjustment signal has been received. If yes, the mirror adjustment process (angle adjustment) is performed in S113. Because a relationship between the image projection angle to the windshield 7 and the curvature of the reflective surface changes with the movement of the dimming mirror position which is in the ON state, the depression angle of the display image as viewed from the driver may change. In order to keep the depression angle constant, a vertical angle of the dimming mirror is adjusted. Incidentally, when the multiple dimming mirrors 30 are disposed, an inclination of the dimming mirrors 30 in the anteroposterior direction may be provided according to the position of the respective mirrors, thereby being capable of absorbing a change in the depression angle of the display image caused by the mirror switching.

Since S114 and the subsequent steps are the same as those in FIG. 5(b), a description of those steps will be omitted.

Similarly, in this case, it has been described that the display area of the image is moved in the right and left direction by taking the change of the steering wheel angle as an example, but it goes without saying that the same can be applied to a change in the above conditions (1) to (5).

According to the present example, since the moving mechanism of the mirror becomes unnecessary, the HUD configuration becomes simpler and the display position can be switched at high speed.

EXAMPLE 6

In an example 6, a configuration for enlarging the display area will be described. A size of an area in which one image can be displayed by one HUD is limited by a size of the mirror, or the like. In the present example, the image is displayed while the mirror is moved at high speed, to thereby enlarge the display area.

Figure 33:
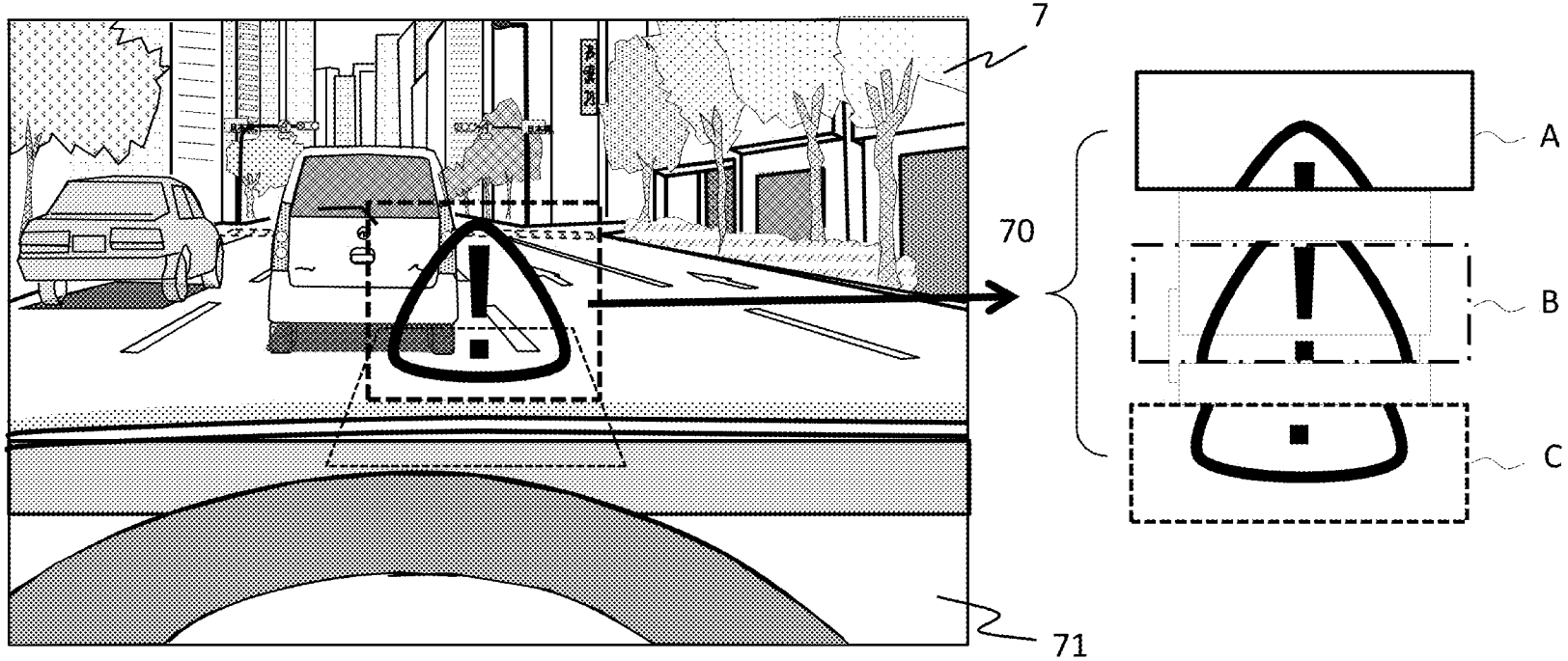
FIG. 33 is a diagram showing an example of an image display state as viewed from a driver's seat according to an example 4.

FIG. 33 is a diagram showing an example of the image display state as viewed from the driver's seat. The image light is emitted from the HUD installed on a bottom of the dashboard 71 and displayed at the reflection position 70 of the windshield 7. In this example, multiple partial images A, B, and C are alternately displayed on the reflective position 70 while shifting the partial images A, B, and C in a vertical direction, thereby being capable of enlarging the display area more than a case in which a single image (for example, only the image B) is displayed.

Figure 34:
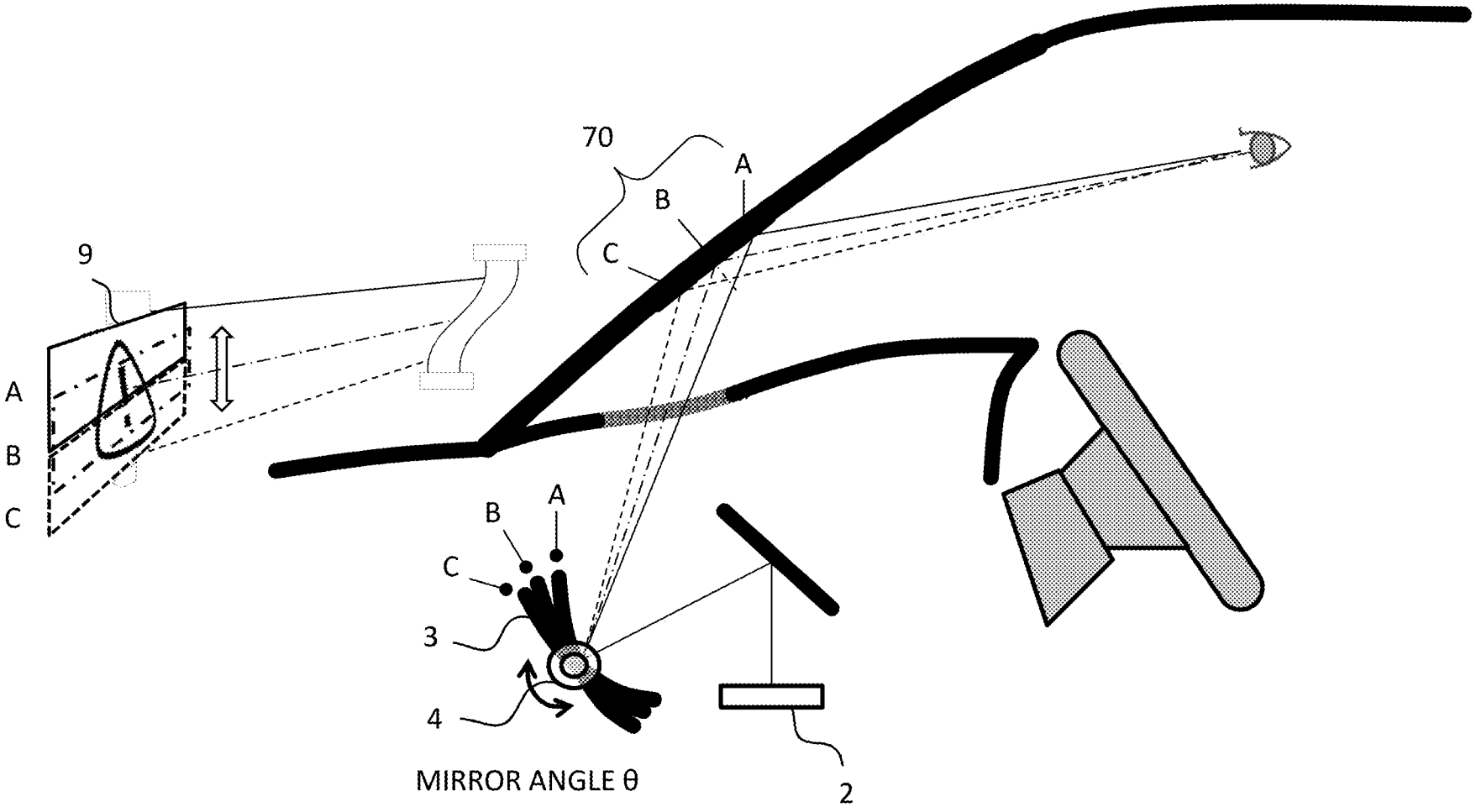
FIG. 34 is a cross-sectional view of the inside of the vehicle showing the image display operation.

FIG. 34 is a cross-sectional view showing the inside of the vehicle showing the image display operation. The image light emitted from the image display device 2 is reflected at the mirror 3 and the reflection position 70 of the windshield and the driver visually recognizes the image as the virtual image 9. At that time, the image is displayed while the mirror 3 is rotated by a predetermined angle θ by the mirror drive unit 4, as a result of which the display positions of the reflection position 70 and the virtual image 9 can be shifted in the vertical direction like A, B, and C. Then, the respective partial images A, B, and C shown in FIG. 33 are displayed in synchronization with the rotational position of the mirror (that is, the display positions A, B, and C). Conversely, the rotation position of the mirror may be controlled in synchronization with timing of generating the partial images A, B, and C. The partial images A, B, and C can be generated by changing the cutting position of the entire image (drawing start position) in the vertical direction.

The motion of the mirror by the mirror drive unit 4 may be either a reciprocating motion between A and C or a rotational motion in one direction. However, in the case of the moving image, the mirror is made to move at high speed to follow the change speed. In addition, when the motion of the mirror is a continuous motion, since the image is displayed only at the timing when the rotational position of the mirror coincides with the display position of each partial image, an effective display time (duty ratio) becomes short. In order to lengthen the effective display time, it is preferable that the motion of the mirror is intermittent motion (step feed) instead of continuous motion.

Figure 35:
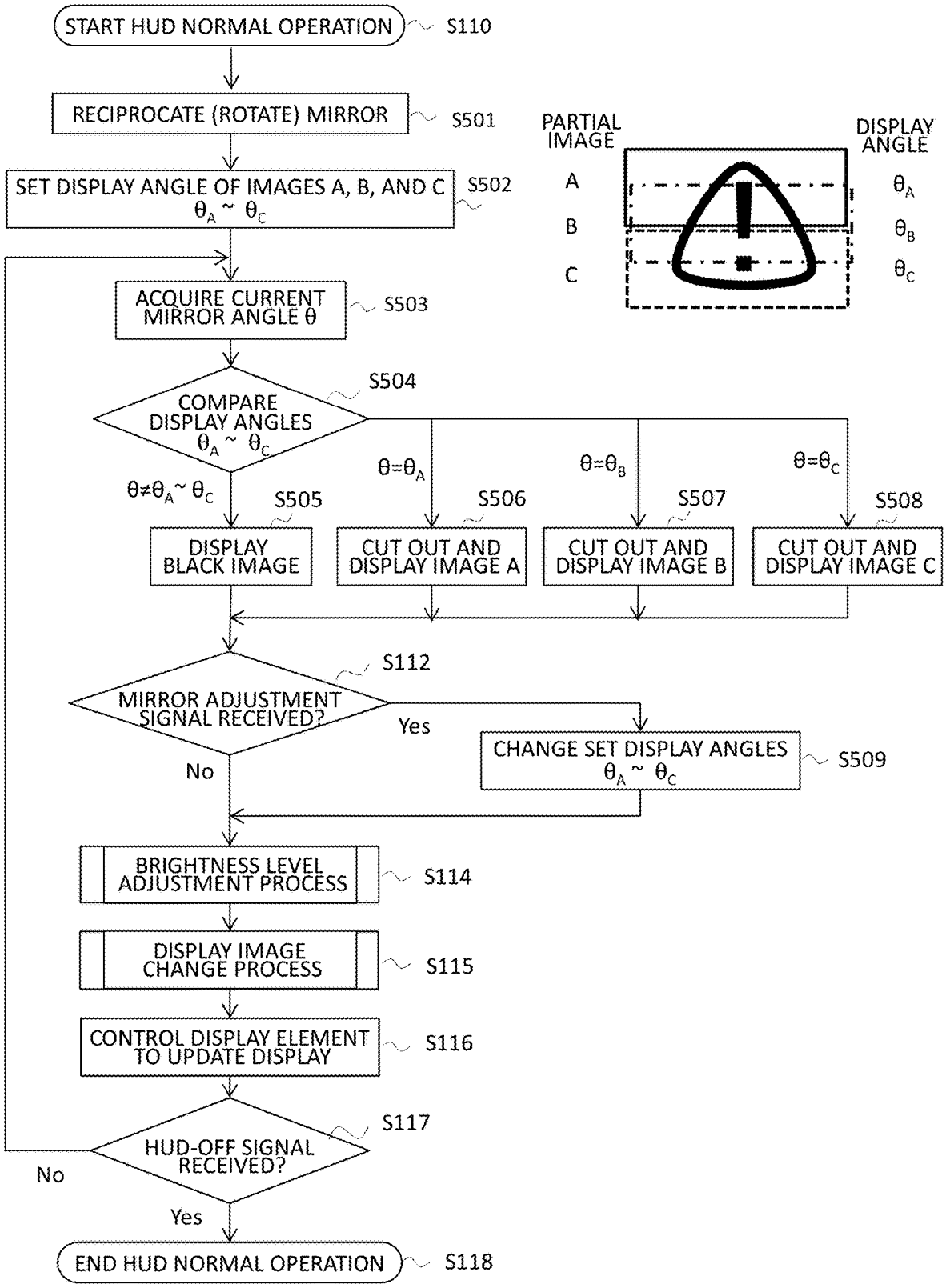
FIG. 35 is a flowchart showing an enlarged image display operation by mirror movement.

FIG. 35 is a flowchart showing an enlarged image display operation by the mirror motion. Processes for the mirror motion and the display image switching are added to the HUD normal operation of FIG. 5(b).

In S501, the mirror drive unit 4 starts a reciprocating (or rotating) motion of the mirror 3. In this example, the mirror motion is a continuous motion for simplicity. In S502, the display element drive unit 17 determines a division specification of the display image (for example, division into partial images A, B, and C), and the mirror adjustment unit 18 sets mirror angles (display angles) $\theta_A$, $\theta_B$, and $\theta_C$ for displaying the respective partial images A, B, and C and stores the set mirror angles in the memory 14.

In S503, the angle θ of the current mirror is acquired from the mirror drive unit 4, and in S504, the mirror adjustment unit 18 compares the current mirror angle θ with the display angles $\theta_A$, $\theta_B$, and $\theta_C$. As a result of the comparison, if the current mirror angle θ is different from any of the display angles $\theta_A$, $\theta_B$, and $\theta_C$, the process advances to S505, and the display element drive unit 17 outputs a black image to the image display device 2. Alternatively, the light source adjustment unit 15 may turn off the light source 21.

As a result of the comparison, if the current mirror angle θ coincides with the display angle $\theta_A$, the process proceeds to S506, and the display element drive unit 17 cuts out the partial image A and outputs the partial image A to the image display device 2 and displays the partial image A. Likewise, if the current mirror angle θ coincides with the display angle $\theta_B$, the process advances to S507, and the display element drive unit 17 cuts out and displays the partial image B. If the current mirror angle θ coincides with the display angle $\theta_C$, the process proceeds to S508, and the display element drive unit 17 cuts out and displays the partial image C.

In S112, it is determined whether the mirror adjustment signal has been received or not, and if the mirror adjustment signal has been received, the process proceeds to Step S509, the values of the display angles $\theta_A$, $\theta_B$, and $\theta_C$ set in S502 are changed according to the mirror adjustment signal. S114 and the subsequent steps are the same as those in FIG. 5(b).

S503 to S117 are repeatedly executed in this manner to display the partial images A, B, and C alternately, as a result of which the entire image can be displayed. According to the present example, with the use of one HUD, the display area of the image is enlarged so that the image of a large screen can be displayed.

The present invention is not limited to the embodiments described above, but the present invention includes various modifications. For example, a part of one embodiment configuration can be replaced with another embodiment configuration, and the configuration of one embodiment can be added with the configuration of another embodiment. Also, in a part of the respective embodiment configurations, another embodiment configuration can be added, deleted, or replaced.

REFERENCE SIGNS LIST

1: vehicle,
2: image display device,
3: mirror,
4: mirror drive unit,
5: vehicle information acquisition unit,
6: speaker,
7: windshield,
8: driver's eye (eye point),
9: virtual image,
10: control unit,
11: electronic control unit (ECU),
15: light source adjustment unit,
16: distortion correction unit,
17: display element drive unit,

18: mirror adjustment unit,
19: centroid calculation unit,
21: light source,
23: display element,
24: HUD position adjustment unit,
25: HUD drive unit,
26: projection angle adjustment unit,
27: projection angle drive unit,
28: dimming mirror control unit,
29: dimming mirror voltage supply unit,
30: dimming mirror,
41, 42, 43: rotary motor,
44, 45: movable arm,
50: vehicle information,
65: centroid position,
70: windshield reflection position,
100, 100a: head up display (HUD),
119: load sensor,
120: position sensor

The invention claimed is:

1. An image display apparatus for a vehicle which is mounted on a vehicle, and is configured to project an image light on a windshield and to form a virtual image in front of the windshield to display an image for a driver, the image display apparatus comprising:

an image display unit that includes a light source and a display element and emits the image light;

a mirror configured to reflect the image light emitted from the image display unit toward the windshield;

a mirror drive unit that is controlled to change an angle and a position of the mirror; and a control unit configured to determine change amounts in the angle and the position of the mirror and controls the mirror drive unit, wherein the control unit is configured to determine the change amounts in the angle and the position of the mirror in conjunction with each other to cause the virtual image to be visually recognized and prevent a display state of the image for the driver from changing when a position of the driver's eyes changes, and wherein the mirror drive unit includes a link mechanism having three rotary motors configured to rotate the mirror and two movable arms which couple the rotary motors with each other.

2. The image display apparatus for a vehicle according to claim 1, wherein the control unit is configured to determine the change amounts in the angle and the position of the mirror in conjunction with each other to prevent a reflection position of the image light in the windshield from changing when if the position of the driver's eyes changes.

3. The image display apparatus for a vehicle according to claim 1, wherein the control unit is configured to determine the change amounts in the angle and the position of the mirror in conjunction with each other to prevent an angle of a visual line at which the driver looks down on the virtual image from changing when if the position of the driver's eyes changes.

4. The image display apparatus for a vehicle according to claim 1, wherein the control unit is configured to determine the change amounts in the angle and the position of the mirror in conjunction with each other to prevent a position of the virtual image visually recognized by the driver from changing when if the position of the driver's eyes changes.

5. The image display apparatus for a vehicle according to claim 1, wherein the control unit calculates a centroid position of the driver and estimates the position of the driver's eyes according to detection results of a load sensor and a position sensor provided in a driver's seat of the vehicle, and controls the mirror drive unit to change the angle and position of the mirror according to the estimated position of the driver's eyes by selecting an optimum adjustment amount from a plurality of previously stored optimum adjustment amounts based on the estimated position of the driver's eyes.

*6. An image display apparatus for a vehicle which is mounted on a vehicle, and is configured to project an image light on a windshield and to form a virtual image in front of the windshield to display an image for a driver, the image display apparatus comprising:*

*an image display device that includes a light source and a display element and emits the image light;*

*a mirror configured to reflect the image light emitted from the image display device toward the windshield;*

*a mirror drive device that is controlled to change an angle and a position of the mirror; and*

*a controller configured to determine change amounts in the angle and the position of the mirror and controls the mirror drive device,*

*wherein the controller is configured to determine the change amounts in the angle and the position of the mirror in conjunction with each other to cause the virtual image to be visually recognized when a position of the driver's eyes changes, and*

*wherein the mirror drive device is placed in a housing that houses the mirror, and includes a rotation mechanism configured to rotate the mirror around a mirror rotation axis, and a moving mechanism configured to move a position of the mirror rotation axis in a vertical direction and in a front and rear direction.*

*7. The image display apparatus for a vehicle according to claim 6,*

*wherein the controller is configured to determine the change amounts in the angle and the position of the mirror in conjunction with each other to prevent a reflection position of the image light in the windshield from changing when the position of the driver's eyes changes.*

*8. The image display apparatus for a vehicle according to claim 6,*

*wherein the controller is configured to determine the change amounts in the angle and the position of the mirror in conjunction with each other to prevent an angle of a visual line at which the driver looks down on the virtual image from changing when the position of the driver's eyes changes.*

*9. The image display apparatus for a vehicle according to claim 6,*

*wherein the controller is configured to determine the change amounts in the angle and the position of the mirror in conjunction with each other to prevent a position of the virtual image visually recognized by the driver from changing when the position of the driver's eyes changes.*

*10. The image display apparatus for a vehicle according to claim 6,*

*wherein the controller calculates a centroid position of the driver and estimates the position of the driver's eyes according to detection results of a load sensor and a position sensor provided in a driver's seat of the vehicle, and controls the mirror drive device to change the angle and position of the mirror according to the estimated position of the driver's eyes by selecting an optimum adjustment amount from a plurality of previously stored optimum adjustment amounts based on the estimated position of the driver's eyes.*

* * * * *